United States Patent [19]
Klein et al.

[11] Patent Number: 5,567,748
[45] Date of Patent: Oct. 22, 1996

[54] WATER COMPATIBLE AMINE TERMINATED RESIN USEFUL FOR CURING EPOXY RESINS

[75] Inventors: Dieter H. Klein, Rheinmuenster; Hans J. Wessely, Achern, both of Germany

[73] Assignee: The Dow Chemical Company, Midland, Mich.

[21] Appl. No.: 244,343

[22] PCT Filed: Dec. 17, 1992

[86] PCT No.: PCT/US92/11075

§ 371 Date: May 25, 1994

§ 102(e) Date: May 25, 1994

[87] PCT Pub. No.: WO93/12187

PCT Pub. Date: Jun. 24, 1993

[30] Foreign Application Priority Data

Dec. 17, 1991 [GB] United Kingdom ............... 9126760
May 19, 1992 [GB] United Kingdom ............... 9210645

[51] Int. Cl.$^6$ .............................. C08K 3/20; C08L 63/02
[52] U.S. Cl. .................. 523/420; 428/413; 523/404; 525/526; 528/111; 564/505
[58] Field of Search .................... 523/404, 420; 428/413; 564/505, 506; 525/526; 528/111

[56] References Cited

U.S. PATENT DOCUMENTS

| | | |
|---|---|---|
| 3,650,996 | 3/1972 | Güldenpfennig . |
| 3,720,648 | 3/1973 | Güldenpfennig . |
| 3,758,421 | 9/1973 | Nikles, Jr. . |
| 3,888,812 | 6/1975 | Plettner . |
| 3,926,886 | 12/1975 | Kelley et al. . |
| 4,107,112 | 8/1978 | Latta, Jr. et al. . |
| 4,128,515 | 12/1978 | Tobias et al. . |
| 4,230,552 | 10/1980 | Schimmel et al. . |
| 4,263,352 | 4/1981 | Kaltenbach et al. . |
| 4,289,826 | 9/1981 | Howell, Jr. . |
| 4,308,183 | 12/1981 | Williams . |
| 4,315,044 | 2/1982 | Elmore et al. . |
| 4,385,138 | 5/1983 | Sagane et al. . |
| 4,423,166 | 12/1983 | Moriarity et al. . |
| 4,436,848 | 3/1984 | Haines et al. . |
| 4,478,985 | 1/1985 | Bekooji et al. . |
| 4,522,851 | 6/1985 | Rosthauser . |
| 4,602,053 | 7/1986 | Huybrechts et al. . |
| 4,608,304 | 8/1986 | Rosthauser . |
| 4,614,775 | 9/1986 | Bekooji et al. . |
| 4,686,248 | 8/1987 | Bekooji et al. . |
| 4,859,721 | 8/1989 | Oberkobusch et al. . |
| 4,987,163 | 1/1991 | Becker et al. . |

FOREIGN PATENT DOCUMENTS

| | | |
|---|---|---|
| 0070550 | 1/1983 | European Pat. Off. . |
| 070550 | 4/1986 | European Pat. Off. . |
| 3222528 | 12/1983 | Germany . |
| 3222531 | 12/1983 | Germany . |
| 3345398 | 8/1985 | Germany . |
| 3345399 | 6/1986 | Germany . |
| 3906144 | 9/1990 | Germany . |
| 1380108 | 1/1975 | United Kingdom . |
| 1493930 | 11/1977 | United Kingdom . |
| 1533815 | 11/1978 | United Kingdom . |

OTHER PUBLICATIONS

Japan Patent Abstracts vol. 12 No. 198, 8 Jun. 1988.
Chemical Abstract 82: 126 691n (1975) describing Japan Kokai 74 94,786.

*Primary Examiner*—Melvyn I. Marquis
*Assistant Examiner*—D. Aylward

[57] ABSTRACT

A water miscible or soluble amine terminated resin useful as a curing agent comprising the reaction product of: A) a polyamine component comprising one or more hydrophilic poly(oxyalkylene) amines, and optionally one or more hydrophobic polyamines; B) a polyepoxide component comprising one or more diglycidyl ethers of a polyalkylene glycol, one or more diglycidyl ethers of a cycloalkylene glycol and optionally one or more hydrophobic polyglycidyl ethers, wherein the mixture is optionally advanced by an amine extender; C) optionally, a reactive diluent which is capable of reacting with an epoxy resin, and D) optionally, a catalyst for the reaction of an amine with an epoxy resin; wherein Component A is employed in an equivalent excess with respect to Component B such that the terminal moieties of the reaction product are amine moieties capable of reacting with an epoxy resin; the composition has an amine hydrogen equivalent weight of from 140 to 240; and the composition is water soluble or water miscible. In preferred embodiments such amine terminated resin is an efficient pigment grinding vehicle. The aminate terminated resin can be dispersed in water with a polyepoxide to form a coating composition.

12 Claims, No Drawings

WATER COMPATIBLE AMINE TERMINATED RESIN USEFUL FOR CURING EPOXY RESINS

The invention relates to water-soluble or miscible resin compositions having terminal amine moieties which are capable of reacting with glycidyl ether moieties preferred embodiments of which are particularly useful in pigmented coating compositions. In another aspect, the invention relates to a process for preparing such resins. In yet another aspect, the invention relates to water-based coating compositions based on amine terminated resin compositions of the invention and further containing curable epoxy resins.

EP 0 070 550 discloses aqueous dispersions of resinous coating compositions which contain 0.5 to 40 percent by weight of an ungelled resin formed by reacting a polyepoxide with a polyoxyalkylene polyamine, which reaction product is partially neutralized with acid to provide cationic groups; and 60 to 99 percent by weight of an additional cationic resin which is electrodepositable on the cathode. The use of polyglycidyl ethers of polyhydric alcohols as the polyepoxide is disclosed but discouraged. The reference does not disclose a composition which is water soluble or dispersible in the absence of converting some of the terminal groups to cationic moieties. Nor does it disclose a composition which can be used as a curing agent for other epoxy resins in two part coating compositions.

Two part epoxy resin based coating systems generally comprise a curable epoxy resin and a curing agent for the epoxy resin, and are commonly dispersed or dissolved in a solvent, primarily an organic solvent to prepare coating compositions, for example paints and floor sealants. Significant environmental concerns are created due to the use of such organic solvent based coating compositions as the evaporation of the organic solvents create the potential for environmental pollution and for creating health hazard. On the other hand, cured epoxy resin based coatings provide hard and abrasion resistant coatings which are resistant to hydrocarbons and aqueous media.

Water-based resins systems consisting of an epoxy resin and a curing agent dissolved or emulsified in water have been developed, and create less environmental and health concerns. The advantages of water dispersible epoxy resin systems include reduced environmental pollution, less obtrusive solvent odor during application, reduced health and safety risks, reduced flammability, water clean-up of application equipment, excellent wettability to moist concrete and good adhesion and mechanical strength. Known two part water-based epoxy resin emulsion coating compositions have significant disadvantages. It is difficult to develop stable emulsions, which have high solids content and low viscosity and therefore good flowability. Further, many of the known systems display poor coatings properties, as they do not readily coalesce when coated on a substrate resulting in coatings with poor flexibility and adhesion. Such systems have a very limited balance between hydrophilic and hydrophobic properties resulting in little flexibility in the formulation of coatings. Such systems suffer from the inability to effectively incorporate pigments into the coating composition. Pigments are often blended with the curing agent with grinding or agitation, and when some curing agents are blended with pigments the mixture undergoes exothermic heating and the curing agent can begin to react thus increasing the viscosity. This causes the flow properties of the system to deteriorate, making application of the system difficult or impossible. Other known curing agents do not form-stable dispersions containing the pigments.

What is needed is a curing agent for epoxy resins which forms a stable water-emulsion or is water soluble. Such a curing agent which cures aqueous epoxy resin compositions to give good coatings with good drying speeds is needed. Further, what is needed is two part coating com positions of epoxy resins and curing agents therefor which are stable and give good coating properties; i.e. low color formation, low viscosity, adhesion, toughness, resiliency and flexibility. Such formulations with high solid levels are needed. A curing agent which has the ability to emulsify epoxy resins in water is also needed. What is also needed is a water soluble or miscible curing agent that forms good coatings when used with water emulsifiable epoxy resin compositions and forms stable dispersions with standard pigment systems.

The invention provides a water miscible or water soluble curing agent for an amine curable resin which is the reaction product of:

A.) a polyamine component comprising one or more hydrophilic poly(oxyalkylene) amines, or a mixture of one or more poly(oxyalkylene) amines with one or more relatively hydrophobic polyamines;

B.) a polyepoxide component comprising i) one or more diglycidyl ethers of a polyalkylene glycol, ii) one or more diglycidyl ethers of a cycloalkylene glycol or a mixture thereof, and optionally iii) one or more relatively hydrophobic polyglycidyl ethers or the reaction product of i), ii) or a mixture thereof and optionally iii) with an amine extender having two active amine hydrogen atoms;

C.) optionally, a reactive diluent which is capable of reacting with an epoxy resin; and D.) optionally, a catalyst for the reaction of an amine with an epoxy-resin; wherein component A is employed in equivalent excess with respect to component B, such that the terminal moieties of the reaction product are amine moieties capable of reacting with an epoxy resin and wherein the composition has an amine hydrogen equivalent weight of from 140 to 240, and the combined amounts of the amine terminated polyalkylene glycol and the diglycidyl ether of polyalkylene glycol and/or diglycidyl ether of a cycloalkylene glycol is sufficient to render the composition water soluble or water miscible.

In another embodiment the invention is a process for the preparation of a water miscible or water soluble curing agent for an amine curable resin which process comprises contacting an excess of the polyamine component A.; the polyepoxide component B.; optionally, the reactive diluent C.; and optionally, a catalyst D. wherein the combined amount of the amine terminated polyalkylene glycol and the diglycidyl ether of polyalkylene glycol and/or diglycidyl ether of a cycloalkylene glycol is sufficient to render the final composition water soluble or water miscible. Reaction is initiated by heating the components until an exotherm results and thereafter maintaining the temperature at temperature at which amine moieties react with 1,2 glycidyl ether moieties until an amine hydrogen equivalent weight of from 140 to 240 is achieved. The terminal moieties of the reaction product are amine moieties capable of reacting with an epoxy resin.

In a preferred embodiment the curing agent is also an effective pigment grinding vehicle. In this embodiment, the polyepoxide component B.) has an EEW of from 200 to 450 and comprises i), ii), a mixture thereof or the reaction product of i), ii) or a mixture thereof with an amine extender. Optionally, sufficient inorganic or organic acid is present to render the composition water soluble. Additionally, the chlorine content of the curing agent is 5.5 percent by weight or less.

In another embodiment the invention is a stable pigmented aqueous coating composition comprising I.) water; II.) an amine terminated resin as described hereinbefore, optionally in admixture with a pigment composition; and III.) a polyepoxide. In a preferred embodiment the polyepoxide is a water dispersible or emulsifiable polyepoxide composition.

The curing agents of the invention cure epoxy resin compositions to form coatings which exhibit good gloss, hardness and color. Compositions containing the curing agents of the invention have low viscosities and exhibit good drying rates. The curing agents demonstrate good compatibility with a wide variety of emulsifiers for water bourne epoxy resins and with pigment compositions commonly used for coatings. Furthermore in a preferred embodiment the curing agents are capable of emulsifying epoxy resins in water.

The polyamine composition must contain sufficient hydrophilic amine (amine terminated polyalkylene glycol) such that in combination with the hydrophilic polyepoxide the amine terminated composition has sufficient hydrophilicity that it is water soluble or water miscible. Another polyamine may be present in the polyamine composition, which is preferably more hydrophobic than the amine terminated polyalkylene glycol. The hydrophilic polyamine is a water or $C_{1-6}$ alkane polyol initiated polyalkylene glycol terminated with $C_{1-12}$ hydrocarbyl moiety having primary or secondary amine moieties. The polyalkylene glycol chains useful herein can comprise units derived from ethylene, oxide, propylene oxide, butylene oxide, ethylene glycol, propylene glycol, butylene glycol, a butane diol (such as 1,3 butane diol), tetrahydrofuran, a propanediol (such as 1,2 or 1,3 propane diol) or a mixture thereof. Preferably the polyalkylene glycol chain is comprised of units: derived from ethylene oxide, propylene oxide, a mixture of ethylene oxide and propylene oxide, or tetrahydrofuran and more preferably of units derived from ethylene oxide or a mixture of units derived ethylene oxide and propylene oxide. In those embodiments where the polyalkylene glycol chain contains a mixture of units from different alkylene oxides, the arrangement of the different alkylene oxide units may be random; or in blocks of the same alkylene oxide. Preferably the terminal amines are primary amines. The poly(oxyalkylene) amines require sufficient alkylene oxide derived units so that poly(oxyalkylene) amines and hydrophilic polyepoxides present render the final amine terminated resin water soluble or miscible. Preferably the poly(oxyalkylene) amines have an amine hydrogen equivalent weight of 100 or less, and more preferably 80 or less. Preferably the poly(oxyalkylene) amines have an amine hydrogen equivalent weight of 30 or more. Preferably the hydrophilic amines useful in the invention correspond to Formula 1

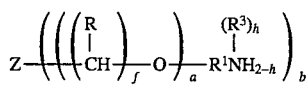     1 wherein:

R is independently in each occurrence hydrogen, methyl or ethyl;

$R^1$ is independently in each occurrence a $C_{1-10}$ straight- or branched-chain alkylene, $C_{1-10}$ to straight- or branched-chain alkenylene, or a $C_{5-12}$ divalent cycloaliphatic moiety;

$R^3$ is independently in each occurrence hydrogen or a $C_{1-10}$ straight- or branched-chain alkyl moiety;

Z is independently in each occurrence oxygen or

X is independently in each occurrence a straight- or branched-chain $C_{1-6}$ alkyl moiety;

a is independently in each occurrence a positive real number of 1 or greater;

b is independently in each occurrence 2 or 3;

f is independently in each occurrence an integer of from 2 to 4; and h is independently in each occurrence 0 or 1;

with the proviso that for each

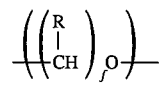

unit if f is 2 and one R is ethyl and the other R must be hydrogen, and if f is 3 or 4, R is hydrogen.

Preferably Z is oxygen. Preferably X is a $C_{2-4}$ alkylene moiety. Preferably R is hydrogen or methyl and more preferably hydrogen. Preferably $R^1$ is a $C_{1-10}$ straight- or branched-chain alkylene moiety and more preferably a $C_{2-4}$ alkylene moiety. Preferably a is from 2 to 6 and more preferably 2.6 to 3. Preferably b is 2. Preferably h is 0.

Such hydrophilic polyamines are well known in the art. Examples of preferred hydrophilic polyamines are the polyamines available from Texaco under the tradename JEFFAMINE, for example, JEFFAMINE EDR 148 triethylene glycol diamine, JEFFAMINE EDR 192 tetraethylene glycol diamine, and JEFFAMINE D230 poly(oxypropylene)diamine corresponding to the formula $H_2N-CH(CH_3)CH_2(OCH_2CH(CH_3)-)_xNH_2$ wherein x is 2.6. Other preferred hydrophilic amines are 3,3'-(oxybis(2,1-ethanedioxy))bis-1-propane amine and bis(3 aminopropyl) polytetrahydrofuran having a molecular weight of 750 available from BASF.

The additional polyamines which may optionally be present include polyamines containing at least two primary or secondary amine moieties which are capable of reacting with an epoxy resin, preferably such compounds are relatively hydrophobic. The term relatively hydrophobic in reference to a polyamine means such polyamine is more hydrophobic than the "hydrophilic polyamines". These polyamines are included in the composition in sufficient amounts to enhance the final properties of the coatings prepared using the amine terminated resins of the invention. If too much of the optional polyamines are used the final amine terminated resin will not demonstrate sufficient water affinity to be water soluble or miscible. Preferably the such polyamines correspond to Formula 2

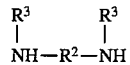     2 wherein $R_3$ is previously defined and $R^2$ is independently in each occurrence a $C_{1-50}$ hydrocarbylene moiety, which may be substituted with a non-interfering substituent and which may contain one or more secondary amines, ether, amide or thioether moieties in the backbone. $R^2$ is preferably a $C_{30-44}$ carbon hydrocarbylene moiety, optionally containing amide or secondary amino moieties in the backbone. $R^3$ is preferably hydrogen or a $C_{1-4}$ straight- or branched-chain alkylene moiety. In Formula 1, $R^3$ is most preferably hydrogen.

Examples of preferred hydrophobic amines include amino-polyamides which are the reaction product of dimeric fatty acids and polyamines, available from The Dow Chemical Company under the trademark D.E.H.™ and the designations 11, 12 and 14.

Sufficient amount of one or more diglycidyl ethers of a polyalkylene glycol or diglycidyl ethers of a cycloalkylene glycol must be present such that in combination with the poly(oxyalkylene) amines the composition has sufficient hydrophilicity to be water soluble or miscible. The diglycidyl ethers of a polyalkylene glycol are water or $C_{1-6}$ alkane polyol initiated polyalkylene glycols terminated with glycidyl ether moieties. The polyalkylene glycol chains useful have been previously defined. Preferably the diglycidyl ethers of a polyalkylene glycol correspond to Formula 3

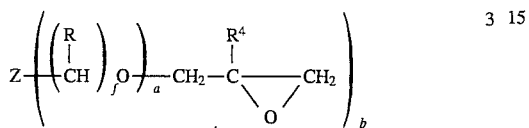

wherein R, Z, a, b and f are as previously described; and $R^4$ is independently in each occurrence hydrogen or $C_{1-4}$ alkyl. The glycidyl ethers of cycloalkylene glycols useful in this invention comprise glycidyl ethers of compounds containing $C_{5-20}$ alkylene chains which contain one or more five or six-membered saturated rings. Preferably the alkylene chain is $C_6$ to $_{10}$ cycloalkylene chain and contains one six-membered saturated ring. A preferred glycidyl ether of a cycloalkylene glycol is the diglycidyl ether of cyclohexane diol. The polyepoxide composition may comprise a single species or a mixture of two or more of the described species.

The polyepoxide component preferably has an epoxy equivalent weight of 2000 or less, more preferably 1000 or less, and most preferably 250 or less. The polyepoxide component preferably has an epoxy equivalent weight of 135 or more and more preferably 190 or more. Where the curing agent is used as a pigment grinding vehicle the polyepoxide component preferably has an epoxy equivalent weight of 450 or less, more preferably 320 or less, and most preferably 250 or less. In such embodiment, the polyepoxide component preferably has an epoxy equivalent weight of 190 or more and more preferably 200 or more. Among more preferred diglycidyl ethers of polyalkylene glycols are those commercially available from The Dow Chemical Company under the trademark D.E.R. designations 732 and 736.

Optionally, the polyepoxide component may comprise a hydrophobic polyglycidyl ether, which is added in an amount which improves the properties of coatings prepared from the resins of the invention and which does not impair the water solubility or miscibility of the resin of the invention. Hydrophobic polyglycidyl ether as used herein refers to any composition which has on average more than one glycidyl ether group per molecule and has a backbone which is not by itself water soluble or miscible. Preferably the hydrophobic polyglycidyl ether corresponds to Formula 4

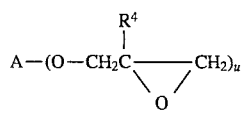

wherein $R^4$ is as previously defined; and,

A is independently in each occurrence an aryl moiety; an aryl moiety substituted with an alkyl or halo moiety; a polyaryl moiety or a polycycloaliphatic moiety wherein the aryl moieties or the cycloaliphatic moieties are connected by direct bonds, alkylene, haloalkylene, cycloalkylene, carbonyl, sulfonyl, sulfinyl, oxygen, or sulfur moieties, such polyaryl or polycycloaliphatic moieties being optionally substituted with one or more alkyl or halo moieties; or the oligomeric reaction product of an aldehyde and phenol; and u is independently in each occurrence a positive real number greater than 1. Preferably, A is an aryl moiety; aryl moiety substituted with one or more $C_{1-4}$ alkyl, bromo or chloro moieties; a polyaryl moiety wherein the aryl moieties are connected by direct bonds, alkylene, haloalkylene, or cycloalkylene moieties, such polyaryl moieties being optionally substituted with one or more $C_{1-4}$ alkyl, bromo or chloro moieties; or the oligomeric reaction product of formaldehyde and phenol. More preferably, A is an aryl moiety; an aryl moiety substituted with one or more methyl or bromo moieties; a polyaryl moiety wherein the aryl moieties are connected by a direct bond, an alkylene or haloalkylene moiety, such poly aryl moieties being optionally substituted with one or more methyl or bromo moieties; or the oligomeric reaction product of formaldehyde and phenol. Preferably, $R^4$ is hydrogen or methyl, and most preferably hydrogen.

Preferable hydrophobic polyglycidyl ethers include the glycidyl ethers of polyhydroxy hydrocarbons, such as dihydroxy phenols (for example resorcinol, catechol and hydroquinone) bisphenols (for example bisphenol, bisphenol A (1,1-bis(4-hydroxyphenyl) propane), bisphenol AP(1,1-bis(4-hydroxylphenyl)-1-phenyl ethane), bisphenol F(1,1-bis(4 -hydroxyphenyl)methane), and bisphenol K), halogenated bisphenols (such as tetrabromobisphenol A and tetrachlorobisphenol A), alkylated bisphenols (such as tetramethylbiphenol, tetramethyl-tetrabromobisphenol, tetramethyltribromobisphenol), trisphenols; phenol-aldehyde novolac resins such as phenol-formaldehyde novolac resins, substituted phenol-aldehyde novolac resins, alkyl substituted phenol-formaldehyde resins, phenol-hydroxybenzaldehyde resins, cresol-hydroxybenzaldehyde resins; phenol-hydrocarbon resins, substituted phenol-hydrocarbon resins such as dicyclopentadiene-phenol resins, dicylcopentadiene-substituted phenol resins and any combination thereof. The hydrophobic polyglycidyl ethers preferably correspond to one of Formulas 5 to 7.

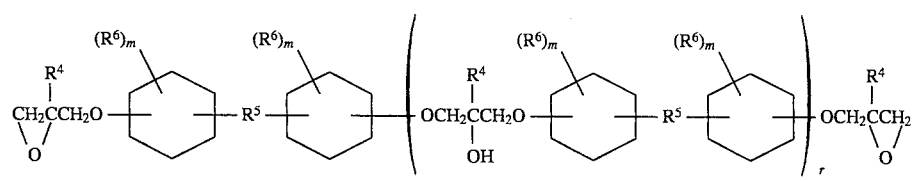

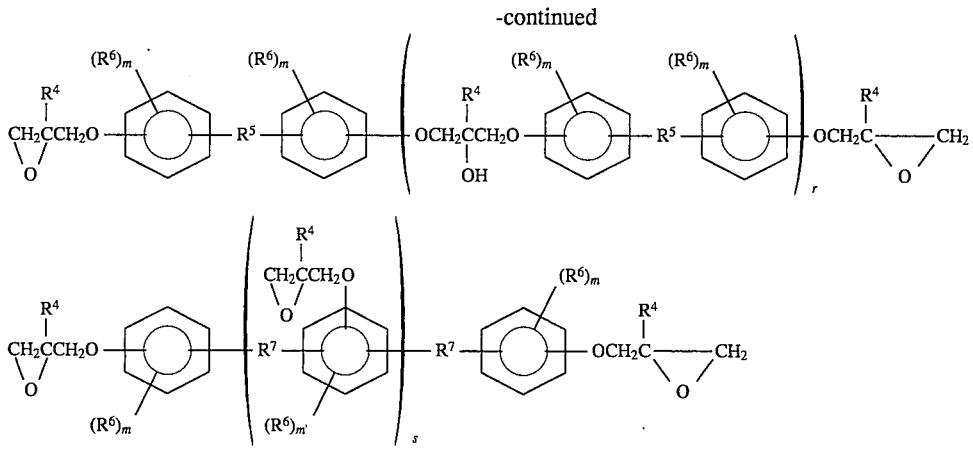

wherein $R^4$ is previously defined;

$R^5$ is independently in each occurrence $C_{1-10}$ alkylene, $C_{4-10}$ haloalkylene, $C_{4-10}$ cycloalkylene, carbonyl, sulfonyl, sulfinyl, oxygen, sulfur, a direct bond or a moiety corresponding to the formula

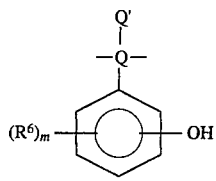

$R_6$ is independently in each occurrence $C_{1-3}$ alkyl or a halogen;

$R^7$ is independently in each occurrence $C_{1-10}$ alkylene or $C_{5-50}$ cycloalkylene;

Q is independently in each occurrence a $C_{1-10}$ hydrocarbyl moiety;

Q' is independently in each occurrence hydrogen, cyano, or a $C_{1-4}$ alkyl group;

m is independently in each occurrence an integer of 0 to 4;

m' is independently in each occurrence an integer of from 0 to 3;

r is independently in each occurrence a positive real number of 0 to 40; and s is independently in each occurrence a positive real number of 1 to 10.

$R^5$ is preferably $C_{1-3}$ alkylene, $C_{1-3}$ haloalkylene, carbonyl, sulfur or a direct bond. $R^5$ is more preferably a direct bond, $C_{1-3}$ alkylene or fluorinated propylene ($=C(CF_3)_{2-}$). $R^5$ is most preferably propylene. $R^6$ is preferably methyl, bromo or chloro; and most preferably methyl or bromo. $R^7$ is preferably $C_{1-3}$ alkylene or polycyclic moiety corresponding to the formula

wherein t is an average number of from 1 to 6, preferably from 1 to 3, and most preferably 1. Preferably m' is an integer of 0 to 2. Preferably m is an integer of 0 to 2. Preferably r is a positive real number of 0 to 10 and most preferably 1 to 5. Preferably s is a positive real number of 0 to 8 and most preferably 1 to 4. All of the variables referred to herein as positive real numbers, i.e. r and s, are average numbers as the compounds referred to contain a distribution of units.

In one embodiment polyepoxides include advanced epoxy resins which are the reaction product of one or more hydrophobic polyepoxides, with one or more polyhydroxy hydrocarbons or a halogenated derivative thereof. Polyepoxides are prepared by reacting an epihalohydrin with a polyhydroxy hydrocarbon or a halogenated polyhydroxy hydrocarbon. The preparation of such compounds is well known in the art. See Kirk-Othmer Encyclopedia of Chemical Technology 3rd Ed. Vol. 9 pp 267–289.

Polyhydroxy hydrocarbon means herein a compound with a hydrocarbon backbone and more than one primary or secondary hydroxy moieties, preferably two or more. Halogenated polyhydroxy hydrocarbon means herein a polyhydroxy hydrocarbon which is substituted with one or more halogens. The hydroxyl moieties may be aromatic aliphatic or cycloaliphatic. Preferable aromatic hydroxyl containing compounds which can be employed herein include, for example, compounds having an average of more than one phenolic hydroxyl group per molecule. Preferable polyhydroxy hydrocarbon include, for example, dihydroxy phenols, bisphenols, halogenated bisphenols, alkylated bisphenols, trisphenols, hydrogenated bisphenols, phenol-aldehyde resins, halogenated phenol-aldehyde novolac resins, alkylated phenol-aldehyde novolac resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins and any combination thereof. Among even more preferred classes of polyhydroxy hydrocarbons and halogenated polyhydroxy hydrocarbons are the bisphenols; halogenated bisphenols; hydrogenated bisphenols; and the novolac resins, i.e. the reaction product of phenols and simple aldehydes, preferably formaldehyde. The most preferred class of polyhydroxy hydrocarbon are the dihydroxy phenols. Preferable dihydroxy phenols include those which contain substituents that are non-reactive with the phenolic groups. Illustrative of such phenols are 2,2-bis(3,5-dibromo-4-hydroxyphenyl) propane; 2,2-bis(4-hydroxyphenyl) propane; 2,2-bis(3,5-dichloro-4-hydroxyphenyl) propane; bis (4-hydroxyphenyl) methane; 1,1-bis(4-hydroxyphenyl)-1-phenyl ethane; 1,1'-bis(2,6-dibromo-3,5-dimethyl-4 hydroxy phenyl) propane; bis (4-hydroxyphenyl) sulfone; bis(4-hydroxyphenyl) sulfide; resorcinol; catechol and hydroquinone. The preferred dihydroxy phenolic compound is 2,2-bis(4-hydroxyphenyl) propane (bisphenol A) and 2,2-bis(4-hydroxy-3,4-dibromophenyl) propane.

As used herein haloalkyl refers to a compound with a carbon chain and one or more of the hydrogens replaced with a halogen, and includes compounds wherein all of the hydrogen atoms have been replaced by halogen atoms. Alkylene as used herein refers to a divalent alkyl moiety. The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated.

In one embodiment the polyepoxide composition can be the reaction product of an amine advancing agent with i) one or more diglycidyl ethers of a polyalkylene glycol, ii) one or more diglycidyl ethers of a cycloalkylene glycol, or a mixture thereof, and optionally one or more hydrophobic polyglycidyl ethers. An amine advancing agent which has matic or cycloaliphatic moiety and most preferably an alkyl substituted phenyl moiety. $R^1$, R, f, and a are as previously defined.

Preferably, the polyglycidyl ethers may be advanced to an epoxy equivalent weight of 2000 or less, more preferably of 1000 or less and most preferably 500 or less. Preferably the polyglycidyl ethers may be advanced to an epoxy equivalent weight of 200 or more, more preferably to an epoxy equivalent weight of 250 or more and most preferably of 450 or more. Preferably the amine advanced polyglycidyl ethers correspond to Formula 11

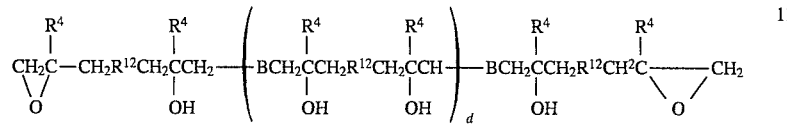

two active amine hydrogen atoms is used to increase the epoxy equivalent weight of the polyepoxide component. The advanced resin has terminal glycidyl ether moieties. An active amine hydrogen atom is a hydrogen atom bound to an amino moiety which will react with a glycidyl ether moiety under advancement conditions. The amines useful for advancing the polyglycidyl ethers are primary amines which are substituted with non-interfering moieties, or amines having two secondary amino moieties which may be further substituted with non-interfering moieties. A non-interfering moiety is a moiety which does not substantially interfere in the reaction or reactions which the compound to which it is attached will be subjected, herein the advancing reaction, the endcapping reaction and the curing reaction. In one embodiment the advancing amine may be substituted with a moiety which functions to catalyze the curing of an epoxy resin by the amine terminated curing agent in which it is incorporated. Such moieties are tertiary amines moieties, hydroxy moieties and heterocyclic amine moieties. Preferably the amines useful as advancing agents correspond to one of the Formulas 8 to 10.

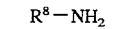    8

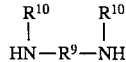    9 or

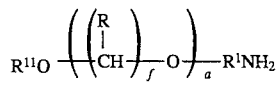    10

$R^8$ is independently in each occurrence a $C_{1-20}$ hydrocarbyl moiety which may be substituted with a non-interfering substituent. Preferably $R^8$ is a $C_{4-10}$ aliphatic, cycloaliphatic, aromatic, alkyl substituted aromatic or alkenyl substituted aromatic moiety; such moieties being optionally substituted with one or more tertiary amine, hydroxy or heterocyclic amine moieties. $R^8$ is more preferably a $C_{6-10}$ aliphatic, aromatic, cycloaliphatic or alkyl substituted aromatic moiety. $R^9$ is a $C_{2-4}$ alkylene moiety. $R^{10}$ is $C_{1-10}$ straight- or branched-chain alkyl moiety; and preferably a $C_{1-4}$ straight- or branched-chain alkyl moiety. $R^{11}$ is $C_{1-50}$ hydrocarbyl moiety, preferably a $C_{1-40}$ alkyl, alkenyl, alkyl substituted aromatic, alkenyl substituted arowherein:

B independently in each occurrence corresponds to one of the formulas

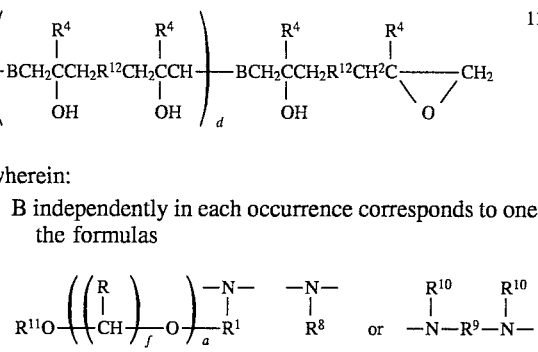

$R^{12}$ is independently in each occurrence a moiety corresponding to one of the formulas

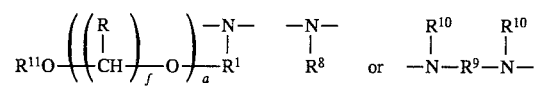

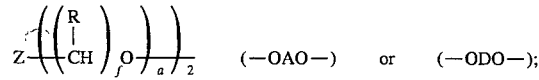

wherein D is independently in each occurrence a $C_{5-20}$ alkylene chain containing one or more five or six membered saturated rings;

d is independently in each occurrence 0 to 5; and $R,R^2,R^3,R^4,R^8,R^9,R^{10},R^{11},A,Z$, and a are as previously defined. More preferably d is 0 to 2. Preferably D is a divalent $C_{5-20}$ aliphatic moiety containing one five or six membered saturated ring, and most preferably a cyclohexane ring.

The amine terminated curing agent of the invention is the reaction product of the polyepoxide compositions as described with the polyamine compositions as described, optionally a reactive diluent, and a curing catalyst, and is substantially terminated with amine groups from the polyamine composition. Substantially terminated means that most of the terminal groups are amines although a minor amount of the terminal moieties may be other moieties, such as glycidyl ether moieties. The terminal amine moieties are reactive with epoxy moieties such that the resin is capable of curing an epoxy resin composition. In general the product comprises the components of the polyepoxide composition endcapped with the components of the polyamine composition. The amine terminated curing agent of the invention contains a small amount of units which are both advanced and endcapped by the components of the polyamine composition. Thus the final composition is a mixture of components. In a preferred embodiment the amine terminated comprises compounds which correspond to Formulas 12 or 13

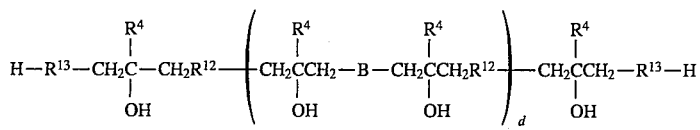

12

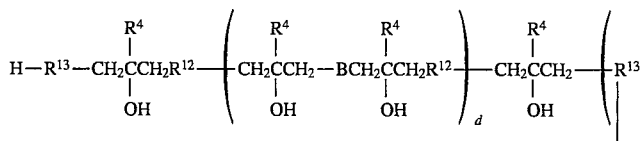

13

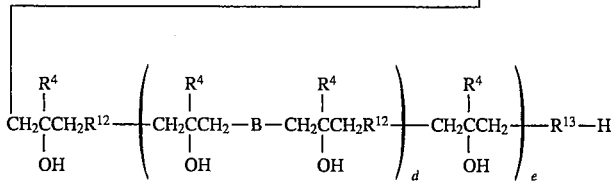

wherein $R^3$ is independently in each occurrence a moiety corresponding to one of the formulas

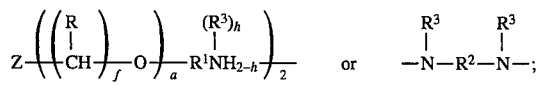

e is independently in each occurrence a positive real number of from. 0 to 4; and R, $R^1$, $R^2$, $R^3$, $R^4$, $R^8$, $R^9$, $R^{10}$, $R^{11}$, $R^{12}$, A, B, D, Z, a, d, f and h are as previously defined. Preferably e is 0 to 2.

Optionally, the reaction product may further comprise a reactive diluent, which is a compound which functions to prevent branching of the resin during the preparation of the amine terminated resin, thereby effectively reducing the molecular weight. Reactive diluents which are well known in the art may be used herein. Preferred reactive diluent include those of the classes of glycidyl ethers of $C_{4-14}$ aliphatic alcohols or glycidyl ethers of monohydroxy aromatic compounds. Examples of such reactive diluent include phenyl glycidyl ether, o-cresyl glycidyl ether, n-butyl glycidyl ether, n-octyl glycidyl ether and 2-ethyl hexyl glycidyl ether.

Optionally, the amine terminated curing agent are prepared in the presence of the catalyst useful for the curing reaction of an epoxy resin with an amine. Any catalyst known in the art for the curing of epoxy resins by an amine curing agent may be used. Examples of such catalyst include carboxylic acids, such as formic acid, bucoic acid, oxalic acid and acetic acid, salicylic acid; phenols; aminophenols, such as amino phenol and tris (dimethyl) aminomethyl phenol ethanol amines; sulfonic acids, such as p-toluene sulfonic acid; zinc carboxylate; organozinc chelate compounds; trialkyl aluminium; quaternary phosphonium and ammonium salts; and tertiary amines and imidazole compounds. The preferred catalysts are imidazole compounds, with 2-phenyl imidazole 2-methyl imidazole, 1-methyl imidazole, 2-ethyl-4-methyl imidazole and 4,4'-methylenebis(2-ethyl-4-methyl imidazole) among particularly preferred catalyst.

The amine terminated curing agents preferably have a molecular (Mn) weight of 450 or greater, more preferably 650 or greater, and most preferably 750 or greater. The amine terminated resins of the invention preferably have a molecular weight (Mn) of 4000 or less, more preferably 2000 or less, even more preferably 1000 or less and most preferably 800 or less. The amine terminated curing agents preferably have an amine hydrogen equivalent weight of 140 or greater. Below 140 the properties of coatings prepared are unacceptable, as the coatings suffer from discoloration due to the formation of by-product due to the reaction of the amine moieties with water and carbon dioxide. Preferably the amine terminated resins have an amine hydrogen equivalent weight of 170 or greater. More preferably the amine terminated resins have an amine hydrogen equivalent weight of 240 or below, as above 240 coatings prepared exhibit poor properties. Preferably the amine terminated resins of the invention have an amine hydrogen equivalent weight of 200 or less, as above 200 the coatings prepared exhibit low hardness. More preferably the amine terminated resins of the invention have an amine hydrogen equivalent weight of 190 or less. Amine hydrogen equivalent weight (AHEW) means herein the average molecular weight of the resin per active amine hydrogen atom, and is determined by calculation using the following formula $$AHEW = \left( \frac{Y}{Z-X} - \frac{W}{X} \right) \cdot Z$$

wherein W is the epoxy equivalent weight of the combined epoxy resin mixture reacted to form the resin; Y is the combined AHEW of the monomeric amine(s) used to form the resin; X combined weight of epoxy resins used to form the resin, and Z the total resin weight. The AHEW of a monomeric amine is calculated by dividing the molecular weight of the amine by the number of active hydrogen atoms present. The amine terminated resins of the invention are water soluble or miscible. More preferably the amine terminated resins of the invention are infinitely dilutable in water, which means a clear homogeneous solution is obtained at any mix ratio of resin to water.

It is the combined amounts of the hydrophilic poly(oxyalkylene) amines, and the diglycidyl ethers of polyalkylene glycols or diglycidyl ether of a cycloalkylene glycol or mixture thereof which render the resin the water soluble or miscible. The relative amounts of each can be adjusted in the resin to affect the properties of the final resin as long as the total amount of such components is sufficient to result in the requisite water affinity. A sufficient amount of the polyamine composition is present to result in the final resin being amine terminated. Preferably 30 percent by weight or more of the polyamine component is present and more preferably 45 percent by weight or more is present. Preferably the polyamine component is present in amounts of 70 percent by weight or less and more preferably 55 percent by weight or less. Preferably the hydrophilic amine terminated polyalkylene glycol is present in amounts of 40 percent by weight or less and more preferably 30 percent by weight or less of the total resin composition. Preferably 3 percent by weight or more of the hydrophilic poly(oxyalkylene) amines glycol is present and more preferably 5 percent by weight or more is present. Preferably 30 percent by weight or more of the polyepoxide component is present and more preferably 45 percent by weight or more is present. Preferably the polyepoxide component is present in amounts of 70 percent by weight or less and more preferably 55 percent by weight or less. Preferably the diglycidyl ether of polyalkylene glycol and/or the diglycidyl ether of cycloalkylene glycol are present in amounts of 55 percent by weight or less, more preferably 45 percent by weight or less. Preferably 30 percent by weight or more of the diglycidyl ether of poly-alkylene glycol is present and more preferably 35 percent by weight or more is present. The hydrophobic polyglycidyl ethers may be present in amounts of 35 percent by weight of less, more preferably 30 percent by weight or less and most preferably 25 percent by weight or less. The hydrophobic polyglycidyl ethers may be present in amounts of 0 percent by weight or more, more preferably 15 percent by weight or more and most preferably 20 percent by weight or more. The additional polyamines may be present in amounts of 30 percent by weight of less, more preferably 25 percent by weight or less and most preferably 20 percent by weight or less. The additional polyamines may be present in amounts of 0 percent by weight or more, more preferably 10 percent by weight or more and most preferably 15 percent by weight or more. The reactive diluent is present in an amount of 0 percent by weight or more, more preferably 1 percent by weight or more and most preferably 5 percent by weight or more. The reactive diluent is present in amounts of 15 percent by weight or less, more preferably 10 percent by weight or less and most preferably 8 percent by weight or less.

In a preferred embodiment 30 percent by weight of the amine terminated curing agent is soluble in water at 40° C. for 30 days. In those embodiments where the amine terminated resin does not achieve this standard, the resin can be neutralized by contacting it with sufficient organic or inorganic acid to render the amine terminated resin soluble at the above defined level. In a preferred embodiment sufficient acid is added to such a solution so that the pH is 8.5 or greater, more preferably 10.0 or greater. Preferable acids are the organic acids with carboxylic acids even more preferred. The more preferred carboxylic acids include oxalic and salicyclic acids. The most preferred acid is salicyclic acid.

In the production of glycidyl ethers chlorine containing by-products may be formed. One class of by-products are compounds containing the hydrolyzable chloride unit represented by the formula

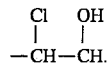

A second class of by-products are the compounds containing bound chloride moieties corresponding to the formula —CH$_2$Cl—. The presence of both adversely affect the water solubility of the amine terminated resins of the invention and the ability of such resins to form stable pigment dispersions. Thus it is desirable to minimize the amount of chlorine present in the resin when used to form stable pigment dispersions. Preferably, the weight percent of chlorine present in the resin is 5.5 percent by weight or less, more preferably 2.0 weight percent or less, and most preferably 1.5 weight percent or less.

In another aspect the invention comprises stable dispersions of pigments in solutions of the amine terminated curing agents. Pigments well known in the art for use with two part epoxy resins compositions may be used in such dispersions, including talc, barium sulfate, zinc phosphate, ion oxide, titanium dioxide and calcium carbonate. The pigment dispersions are prepared by contacting a solution of the amine terminated curing agents in water with the pigment compositions with agitation under conditions such that a stable dispersion is formed. Preferably the amine terminated curing agent is dissolved in water as a level of 70 percent by weight or less and more preferably 50 percent by weight or less. Preferably the amine terminated curing agent solution contains 20 percent or more by weight of the resin and more preferably 30 percent by weight or more. The pigments and aqueous solution of amine terminated curing agent are preferably contacted in a container with stirring or in a mill, such as a ball mill. The contacting is preferably performed at a temperature of 10° C. or greater and more preferably 30° C. or greater. Preferably, the contacting is conducted at a temperature of 50° C. or less, and more preferably 40° C. or less.

In another embodiment the invention is a process for the preparation the amine terminated curing agent. In a preferred embodiment the polyepoxide component is continuously added to the polyamine component to insure that polyepoxide is endcapped, and to facilitate better control of the exothermic reaction. The contacting may be performed in the absence or presence of a solvent. The presence of a solvent is advantageous to control the exothermic reaction. Preferably the solvent is water or a water miscible organic compound, such as a lower alkanol, or an alkylene glycol or an ether thereof. The reaction is activated by heating until the reaction mixture undergoes an exotherm, preferably at 80° C. to 90° C. The reaction may be performed at ambient temperatures but reaction times are quite long, thus the use of higher temperatures is desired. Thereafter the reaction temperature is controlled to maintain it at a temperature at which the amine moieties and glycidyl ether moieties react, preferably at 60° C. or above, more preferably at 80° C. or above. Preferably the temperature is maintained at 150° C. or less, more preferably 100° C or less, and most preferably at 90° C. or less. The temperature is maintained for a time sufficient to result in an substantially amine terminated curing agent having the desired amine hydroxy equivalent weight. If present, the catalyst is present in amounts sufficient to accelerate the reaction, preferably in an amount of from 0 percent by weight or more, more preferably 0.01 percent by weight or more and most preferably 0.02 percent by weight or more. Preferably the catalyst may be present in an amount of 2.0 percent by weight or less, more preferably 1.0 percent by weight or less and most preferably 0.1 percent by weight or less. Thereafter any solvent present may be removed by conventional means, such as distillation, vacuum distillation or steam distillation.

In one embodiment of the invention the polyepoxide component is amine advanced. In this embodiment the i) diglycidyl ethers of a polyalkylene glycol, ii) the diglycidyl ethers of a cycloalkylene glycol, or a mixture thereof and optionally iii) and one or more hydrophobic polyglycidyl ethers are reacted with an amine advancing agent to increase the molecular weight and epoxy equivalent weight of the polyepoxide composition. Catalysts may be employed to facilitate reaction of the polyepoxide component with the advancing amines in the same amount as described for the reaction of the polyamine component with the polyepoxide component. The polyepoxide mixture and advancing amine may be reacted in the absence or presence of a solvent. Solvents which may be used are those which are typically used as solvents for epoxy advancement reactions. Included among preferred solvents are aromatic hydrocarbons, mixtures of aromatic hydrocarbons and alkanols, polyalkylene glycolethers, polyalkylene glycols and ketones. Most preferred are the water soluble or miscible solvents such as the alkanols, polyalkylene glycol ethers and polyalkylene glycols. A reaction in solvent may be advantageous wherein heat control is desired. The advancement reaction is preferably performed at a temperature of 80° C. or above, as below 80° C. the reaction time is too slow. Preferably the reaction is performed at a temperature of 230° C. or less, as the polymer reacts to fast above such temperature and unwanted colors may be formed due to the presence of oxidated byproducts. More preferably the reaction temperature is 150° C. or below. The temperature which may be used for the reaction depends on whether or not a solvent is used and its nature. The polyepoxide advancement reaction is allowed to proceed for a time sufficient to result in substantially complete reaction of the amine with the polyepoxide components. Preferably, the reaction time is 30 minutes or greater, more preferably 2 hours or greater. Preferably the maximum reaction time is 10 hours or less, more preferably 4 hours or less. The reaction may be performed by a batch or continuous addition process. In a batch process all of the reactants are charged to a reactor and reacted under the conditions described hereinbefore. Under a continuous addition process, the amine is continuously added to an excess of the polyepoxide, for example in a plug flow type reactor, and the materials reacted as hereinbefore described.

In one embodiment the polyepoxide mixture is amine advanced in a water dispersion. The process for advancing an epoxy resin in a water dispersion comprises (i) contacting the polyepoxide mixture, the amine advancement agent; a dispersant present in sufficient amount to disperse the composition in water; optionally, a coupling solvent; and water; ii) subjecting the mixture to, stirring or agitation so as to form an oil in water dispersion; iii) heating the reaction mixture to a temperature at which the polyepoxide mixture reacts with the amine advancement agent for a time sufficient to advance the epoxy resin to the desired epoxy equivalent weight. Preferably the solids level (amount of components i), ii) and iii)) in the water dispersion is from 15 to 70 percent by weight, and more preferably from 65 to 70 percent by weight. The dispersant is present in a sufficient amount to form a stable dispersion of the resin composition in water. The amount of the dispersant needed depends on the nature of the dispersant and the resin dispersed, preferably from 1 to 30 percent by weight based on the advanced resin or its components is used. This dispersant is preferably present in an amount of 4 to 30 percent by weight, more preferably from 4 to 10 percent by weight.

The dispersants useful in this invention are those which are capable of dispersing in water the reactants, that is polyepoxide, amine advancing agent, and optionally catalysts. Among preferred classes of dispersants are polymers, block copolymers and random copolymers of alkylene oxides, i.e. ethylene oxide, propylene oxide, and butylene oxide, or monoethers thereof wherein one end of the polymer is terminated in a hydrophobic hydrocarbyl moiety. Preferred classes of such dispersants are alkylphenol initiated poly(oxyethylene) ethanols available from The Dow Chemical Company under the trademark Dowfax™; alkylphenol initiated poly(oxypropylene) poly(oxyethylene)ethanols (available from ICI under the trademark Tensiofix™) and block copolymers containing an internal poly(oxypropylene) block and two external poly(oxyethylene) ethanol blocks (available from BASF-Wyandotte under the trademark Pluronics™). In another embodiment the dispersant can be incorporated into the polyepoxide mixture as an epoxy amphiphile as described in WO Patent Application 91,10695.

In one embodiment all the reactants except water can be charged to a reactor and water is thereafter added until inversion occurs, i.e. water becomes the continuous phase. The mixture is stirred or agitated until a stable oil in water emulsion is formed. Preferably the contacting occurs of 25° C. or above and more preferably 35°C or above. Preferably the contacting occurs at 45° C. or below and more preferably 40° C. or below. Standard means of stirring or agitating the mixture may be used. The mixture is then heated to a temperature at which advancement occurs. Preferably the reactants are reacted at 25° C. or above, more preferably at 40° C. or above and most preferably 60° C. or above. Preferably the reactants are reacted at 98° C. or below and more preferably 90° C. or below. Under superatmospheric pressures temperatures at which the water does not volatilize may be used. The reaction mixture is reacted for a time sufficient to achieve the desired epoxy equivalent weight or amine equivalent weight. Preferred reaction times are 30 minutes or greater, more preferably 2 hours or greater. Preferably the maximum reaction time is 10 hours or less, more preferably 4 hours or less. Preferably the amine advanced epoxy resin has an epoxy equivalent weight of 150 or greater, more preferably 175 or greater and most preferably 200 or greater. Preferably the amine advanced epoxy resin has an epoxy equivalent weight of 45,000 or less, more preferably 7,000 or less, even more preferably 1000 or less and most preferably 650 or less. The dispersions preferably contain amine advanced resin particles with sizes of 1200 Å or greater and more preferably 1500 Å or greater. The dispersion preferably contains amine advanced epoxy resins having particle sizes of 10,000 Å or less and more preferably 5000 Å or less.

The useful optional coupling solvents include glycol ethers, lower alkanols, n-methypyrrolidone or a solvent which has the capability of reacting with amines, for instance n-butyrolactone or the alkylene carbonates, i.e. propylene carbonate.

In one embodiment, the polyepoxide reaction mixture and amine advancing agent may be reacted together in the presence of a polyhydroxy hydrocarbon or halogenated polyhydroxy hydrocarbon. In another embodiment the polyepoxide composition and the polyamine composition may be reacted in the presence of a polyhydroxy hydrocarbon or halogenated polyhydroxy hydrocarbon. In such embodiments the amount of polyhydroxy hydrocarbon or halogenated polyhydroxyhydrocarbon should be such that the ultimate amine terminated curing agent remains water soluble or miscible. Preferably 5 percent by weight or less of polyhydroxy hydrocarbon or halogenated hydrocarbon relative to the total composition is used.

The amine terminated curing agents can be formulated for use in coatings, preferably water based coatings. In one embodiment the amine terminated curing agents are dispersed or dissolved in water, preferably at a solids level of 20 percent by weight or more, more preferably 40 percent by weight or more and most preferably 60 percent by weight or more. The amine terminated curing agents are preferably dispersed or dissolved in water at a solids level of 80 percent by weight or less, more preferably 75 percent by weight or less and most preferably 70 percent by weight or less.

The amine terminated curing agents in water and optionally containing pigments can be contacted with a polyepoxide composition, which is preferably dispersed in water, and the combined materials are coated onto a substrate and subjected to curing conditions. In another embodiment the amine terminated curing agents and optionally pigments are contacted with a polyepoxide composition in the solid form, the mixture is blended, dispersed in water, coated onto a substrate and subjected to curing conditions. Preferably in such embodiment the amine terminated curing agent is sufficiently hydrophilic to disperse the polyepoxide in water in preferred embodiment. In preferred embodiments the amine terminated curing agents are capable of dispersing a hydrophobic epoxy resin composition in water.

The polyepoxides described herein and known in the art may be cured by the amine terminated curing agents. In one embodiment the polyepoxide reacted with the amine terminated curing agent is dispersed in water with the use of an external emulsifier. Examples of useful external emulsifiers which may be used are well known in the art, included are those described hereinbefore for use in preparing the amine advance polyepoxide composition.

In another preferred embodiment the amine terminated resins are contacted with an emulsifiable epoxy resin composition comprising:

A) a polyepoxide of comprising (1) the reaction product of i) one or more polyepoxides, ii) optionally, one or more poly(aromatic hydroxy) containing compounds, iii) optionally, one or more chain terminators; and iv) one or more nominally difunctional $C_{12-36}$ fatty acids, or dimers of unsaturated fatty acids; or (2) a mixture of one or more polyepoxides; and optionally, one or more reactive diluents; with B) a sufficient amount of a surfactant to form a stable emulsion of the epoxy resin in water wherein the surfactant comprises an alkyl aryloxy poly(propyleneoxy) poly(ethyleneoxy) ethanol or a $C_{12-36}$ hydrocarboxy poly(propyleneoxy) poly(ethyleneoxy) ethanol, wherein the hydrocarboxy moiety is the residue of a $C_{12-36}$ fatty alcohol or $C_{12-36}$ fatty acid. Element A) (1) is hereinafter referred to as Reaction Product A.

Reacted into the backbone of the epoxy resin composition Reaction Product A, is a nominally difunctional fatty acid, or dimer of an unsaturated, fatty acid. Nominally difunctional as used herein refers to a mixture of compounds in which a majority of the mixture contains difunctionality and which contains some monofunctional and higher functional compounds. Difunctional means that the compound has two acid groups. Useful herein are $C_{12-36}$ fatty acids containing on average about 2 carboxylic acid groups, or dimers of unsaturated fatty acids. Preferably such nominally difunctional fatty acids or dimers of fatty acids correspond to Formula 14

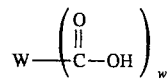
14 wherein W is a straight or branched saturated or unsaturated $C_{12-36}$ hydrocarbon chain; and w is a positive real number of greater than 1. Preferably, w is from 1.8 to 2.25.

Preferably the chain terminator corresponds to the Formula 15, G-F-H; wherein G is a $C_{6-20}$ hydrocarbyl moiety; and F is O, NH, COO, or S. G is preferably an $C_{7-20}$ alkyl substituted aryl moiety or a $C_{12-18}$ saturated or unsaturated hydrocarbon chain. G is even more preferably an alkyl substituted phenyl moiety or a $C_{12-18}$ saturated or unsaturated hydrocarbon chain. Among preferred chain terminators are paratertiary butyl phenol and linseed oil fatty acid.

Optionally reacted into the backbone of Reaction Product A is a poly(aromatic hydroxy) containing compound. A poly(aromatic hydroxy) containing compound means herein a compound which contains more than one hydroxy moiety bound to one or more aromatic rings. Preferably the polyhydroxy compounds are chosen such that the reaction product (A) is not significantly crosslinked. Such highly crosslinked reaction products form gels and do not form good coatings. Some branching may be present as long as the reaction product (A) does not form a gel. Preferably, the average number of hydroxyl moieties per molecule is 2.25 or less, more preferably from 1.9 to 2.1. The preferred poly (aromatic hydroxy) containing compounds are polyphenolic hydroxy compounds, with diphenolic compounds being more preferred.

Preferably Reaction Product A is the reaction product of from 40 to 95 parts by weight of one or more polyepoxides; from 0 to 15 parts by weight of one or more poly (aromatic hydroxy) containing compounds, from 0 to 10 parts by weight of a chain terminator, and from 5 to 25 parts by weight of one or more nominally difunctional $C_{12-36}$ fatty acids, or a dimer thereof, wherein the sum of the parts of components in Reaction Product A is 100. In a more preferred embodiment, Reaction Product A, comprises from 60 to 80 parts by weight of one or more polyepoxides, from 0 to 10 parts by weight of one or more poly (aromatic hydroxy) containing compounds, from 0 to 5 parts by weight of one or more epoxy chain terminators and from 5 to 15 parts by weight of one or more nominally difunctional $C_{12-36}$ fatty acids or dimers thereof. Preferably Reaction Product A demonstrates an epoxy equivalent weight (EEW) of from 200 to 1000, more preferably from 300 to 500.

In order to form a composition which is capable of forming a stable emulsion, the surfactant is present in sufficient amount to provide a composition capable of forming a stable emulsion. Preferably, the surfactant corresponds to the Formula 16

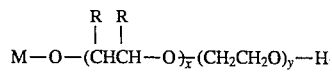
16 wherein

M is an alkyl substituted aryl moiety, or a straight or branched saturated or unsaturated $C_{12-36}$ hydrocarbon chain;

R is as previously defined herein;

x is a positive real number of from 20 to 95; and y is a positive real number from 15 to 100;

with the proviso that M, x and y are selected such that the surfactant has an H-L-B of from 9 to 16.

M is preferably an alkyl substituted aryl moiety, M is more preferably a $C_{6-12}$ alkyl substituted phenyl group, and most preferably nonyl substituted phenyl. The surfactants used in this embodiment often contain residual polyglycols which are block copolymers of ethylene oxide and propylene oxide. Such compounds are present because they are by-products of the processes used to prepare the surfactants described before, which have not been removed. The surfactant is present in a sufficient amount to render the epoxy resin emulsifiable, preferably from 1 to 6 parts per weight per 100 parts of the polyepoxide, and more preferably from 3 to 4 parts per 100 parts the polyepoxide. The surfactant preferably has an H-L-B value of from 9 to 12.

Optionally, the emulsifiable composition comprising polyepoxide and the surfactant may further comprise an organic solvent, which aids in the stabilization of the water emulsion. Such solvent is present in sufficient amounts to stabilize the epoxy emulsion in water. Preferably such solvent is present in amounts of up to 20 weight parts, more preferably from 1 to 10 weight parts and most preferably from 1 to 5 weight parts per 100 weight parts of polyepoxide. Preferred solvents include glycols based on alkylene glycols and ethers thereof, alkyl or hydroxyalkyl substituted benzenes, lower alkanols, y-butyrolactone, y-caprolactone and n-methyl pyrrolidone. The preferred alkylene glycols are those based on ethylene, propylene or butylene oxide. The glycol ethers are alkyl ethers of such glycols. Preferred glycols are those based on propylene oxide and butylene oxide with preferred glycol ethers being lower alkyl ethers of propylene and butylene glycols. The most preferred glycol ethers are the lower alkyl ethers of propylene glycol. Examples of the preferred solvents are methyl ether of propylene glycol, benzyl alcohol, isopropyl alcohol, butyrolactone, y-caprolactone, n-methyl pyrrolidone and xylene.

In another embodiment the emulsifiable epoxy composition comprises (1) 50 to 70 weight percent of the reaction product of (a) 40 to 90 parts by weight of diglycidylether of dihydric phenol, (b) 5 to 35 parts by weight of dihydric phenol, (c) 5 to 25 parts by weight of dimer-fatty acid, and (d) 1 to 10 parts by weight of p-tert.butylphenol and/or monomeric fatty acid, wherein the molecular weight of the epoxy resin is in the range from 500 to 2000 and (2) 1 to 25 weight percent based on resin solids weight, of water-immiscible $C_{8-20}$ aliphatic monoepoxide reactive diluent or high boiling low viscous liquid hydrocarbon resin (e.g. Actrel 400 from Exxon Chemical, bp 330° to 355° C.).

A water emulsion is formed which comprises the polyepoxide, the surfactant, optionally the organic cosolvent, optionally a polyfunctional polyepoxide compound and water. Preferably, the solids level is from 40 to 80 percent, with from 50 to 70 percent solids level being more preferred. Solids level refers herein to polyepoxide, the surfactant, and previously described optional components, in the water emulsion. It is preferred that the emulsion has a viscosity (Brookfield Model RV Spindle No 5, 20 RPM) of from 100 to 1000 mPas at 25° C., and more preferably 500 to 1000 mPa.s.

Where the emulsifiable polyepoxide composition is a mixture of a polyepoxide and optionally a reactive diluent the composition preferably comprises from 75 to 100 parts by weight of one or more polyepoxides and from 0 to 25 parts by weight of a reactive diluent; wherein the sum of such components is 100; and additionally from 1 to 6 parts by weight of a surfactant based on 100 parts of the polyepoxide mixture. Such composition more preferably comprises from 85 to 95 parts by weight of one or more polyepoxides and from 5 to 15 parts by weight of a reactive diluent; wherein the sum of the components are 100; and from 3 to 4 parts by weight of surfactant.

In another embodiment, the invention is a two part coating composition which comprises an aqueous solution or dispersion of the amine terminated curing agents, optionally containing a pigment and an aqueous dispersion of an epoxy resin composition. The amine terminated curing agent is present in sufficient amounts to cure the epoxy resin and form a continuous coating. Preferably the ratio of epoxy (glycidyl ether): equivalents to amine equivalents of the amine terminated curing agent is from 0.5:1 to 2: 1; more preferably 0.6:1.4 to 1.4:0.6; even more preferably 0.8:1.2 to 1.2: 0.8 and most preferably 0.9:1.1 to 1.1:0.9.

The emulsions of this invention may include pigments, dyes, stabilizers, plasticizer's and other conventional additives. Preferably the formulation dispersion or emulsion in water has a solids level of from 10 to 80, and most preferably from 50 to 70.

The coatings of the invention are contacted with a substrate. Water and any cosolvents used are evaporated off to leave a coating. The coating will cure at room temperature in several days. Elevated temperatures may be used to speed up the cure of the coating composition. Preferably the curing temperatures are from 10° C. to 80° C. and more preferably from 10° C. to 40° C. The coating composition may be contacted with the substrate by spraying, pouring or roller-coating the substrate with the formulation.

In the embodiments where coatings are formed from amine terminated resins having an AHEW of greater than 200 such coatings have lower hardness. Such amine terminated resins function as flexibilizers. In formulating coatings amine terminated resins with an AHEW of greater than 200 can be used in admixture with amine terminated resins having an AHEW of less than 200, preferably of from 140 to 190, or alternatively in admixture with known conventional curing agents capable of being dispersed in water. The relative amounts of such components which may be used are dependent upon the final properties desired in the coatings. To increase the flexibility of the coating relatively more of the amine terminated resins of the invention having an AHEW of 200 to 240 may be used. To increase the hardness of the coating relatively more of the amine terminated resins of the invention having an AHEW of 140 to 200, a conventional curing agent or a mixture thereof may be used. It is further contemplated that a mixture of amine terminated resins of this invention with conventional epoxy resin curing agents may be used to cure epoxy resins or water emulsifiable epoxy resin formulations. The relative amounts of the components of such a curing composition is chosen based on the final properties desired in the coating.

Preferable known curing agents which may be used in this invention are those which are soluble or dispersible in water and which contain more than about 2 active hydrogen atoms per molecule. Preferable curing agents include diamines and polyamines or adducts of such polyamines with epoxy resin, such as for example a reaction product of an excess of equivalents of isophorone diamine with a diglycidyl ether of bisphenol A wherein such reaction product preferably has an amine equivalent weight of 115; modified polyamides and amidoamines, and arylic anhydrides. Preferred are the polyamines. Also useful as curing agents are aminoalkylated interpolymers of vinyl carboxylic acids, and salts thereof, as described in U.S. Pat. No. 4,227,621. Preferred curing agents include aliphatic polyamines, polyglycoldiamines, polyoxypropylene diamines, polyoxypropylenetriamines, amidoamines, imidazolines, reactive polyamides, ketimines, arylaliphatic-polyamines (i.e. xylylenediamine), cycloaliphatic amines (i.e. isophoronediamine or diaminocyclohexane) methane diamine, 3,3-dimethyl-4,4-diamino-dicyclohexylmethane, heterocyclic amines (aminoethyl piperazine), aromatic polyamines, (methylene dianiline), diamino diphenyl sulfone, mannich base, phenalkamines and N,N',N"-tris(6-aminohexyl) melamine. Example of more preferred curing agents include modified polyamide curing agents like Casamid 360 (available from Anchor Chemicals (UK) Ltd.) or Epilink DP 660 (available from AKZO) which is an amine-epoxy adduct. Other useful hardeners may be of the Mannich base class which are reaction products between nonyl phenol, formaldehyde and a polyamine e.g. xylylenediamine. Such a product is sold by Akzo under the tradename Epilink DP500.

The following examples are included for illustrative purposes and are not intended to limit the scope of claims herein. All parts and percentages stated herein are by weight, unless otherwise indicated.

The following resins are used in the examples.

Hydrophilic Polyamine A—triethylene glycol diamine available from Texaco under the Trademark JEFFAMINE EDR 148.

Hydrophilic Polyamine B—bis(3 aminopropyl) polytetrahydrofuran having a molecular weight of 750, which corresponds to the formula

Hydrophilic Polyamine C—poly(oxypropylene) diamine having a molecular weight of about 230.
Hydrophilic Polyamine D—3,1'-(oxy bis (2,1-ethane diyloxy)) bis propane amine
Hydrophobic Amine A—isophorondiamine.
Hydrophobic Amine B—Bis(paraaminocyclohexyl)methane
Reactive Polyamide A—a reactive polyamide corresponding to the formula

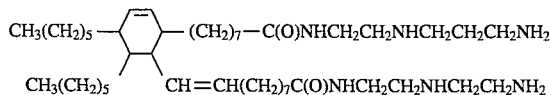

having an AHEW of 200, which is available from The Dow Chemical Company under the trademark DEH 11.
Reactive Polyamide B corresponds to the formula of Reactive Polyamide A, has an amine hydrogen equivalent weight of 135 and is available from The Dow Chemical Company under the trademark DEH 14.
Hydrophilic Polyepoxide A—a polyoxypropylene glycol diepoxide with an epoxy equivalent weight of 310 to 330 available from The Dow Chemical Company under the Trademark D.E.R. 732.
Hydrophilic Polyepoxide B—a glycidyl ether of dipropylene glycol as prepared in Example 23.
Hydrophilic Polyepoxide C—a diglycidyl ether of a polyoxypropylene glycol with an epoxy equivalent weight of 175 to 205 available from The Dow Chemical Company under the trademark DER 736.
Hydrophilic Polyepoxide D—a glycidyl ether of tetrahydrofuran as produced in Example 23.
Hydrophilic Polyepoxide E—the diglycidyl ether of 1,4-bis(hydroxymethyl) cyclohexane as prepared in Example 23.
Hydrophilic Polyepoxide AA—Hydrophilic Polyepoxide A advanced with 3,5-xylidine as described in Example 1.
Hydrophilic Polyepoxide AB—an amine advanced polyepoxide prepared according to Example 5 from Hydrophilic Polyepoxide A, Hydrophobic Polyepoxide C, Hydrophobic Polyepoxide D, Emulsifier A and ethanol amine.
Hydrophilic Polyepoxide AC—a reaction product of Hydrophilic Polyepoxide A and octyl amine
Hydrophilic Polyepoxide AD—reaction product of Hydrophilic Polyepoxide A, Hydrophobic polyepoxide C, and o-cresyl glycidyl ether advanced with octyl amine according to Example 8.
Polyaminoepoxy Adduct A—adduct prepared in Example 24. Polyaminoepoxy Adduct B—adduct prepared in Example 25. Polyaminoepoxy Adduct C—polyaminoepoxy adduct having an AHEW of 140.
Polyaminoepoxy Adduct D—adduct prepared in Example 37.
Amine Catalyst 1-tris (dimethyl) amino)) methyl phenol
Hydrophobic Polyepoxide A-diglycidyl ether of bisphenol F having an EEW of 169–181 available from The Dow Chemical Company under the trademark D.E.R. 354.
Hydrophobic Polyepoxide B—diglycidyl ether of bisphenol A having an epoxy equivalent weight of 182 to 192 available from The Dow Chemical Company under the Trademark D.E.R. 331.

Hydrophobic Polyepoxide C—a diglycidyl ether of bisphenol A having an EEW of 180–188 available from The Dow Chemical Company under the trademark D.E.R.* 330.
Hydrophobic Polyepoxide D—a blend of 75 parts of a diglycidyl ether of bisphenol A having an EEW of 176–184 and 25 parts of o-cresylglycidyl ether available from The Dow Chemical Company under the trademark D.E.R.* 321.
Hydrophobic Polyepoxide E—a 50/50 blend of a diglycidyl ether of bisphenol A and a diglycidyl ether of bisphenol F having an EEW of 170 to 182, available from The Dow Chemical Company under the trademark D.E.R.* 351.
Hydrophobic Polyepoxide F—comprises 85 percent of the reaction product of 65.75 parts of
Hydrophobic Polyepoxide C, 11.5 parts of bisphenol A, 0.86 parts of t-butyl phenol, 7.70 parts of a dimerized $C_{18}$ fatty acid (containing 77 percent dibasic acid, 14 percent polybasic acid and 9 percent monobasic acids) (reaction product EEW 360) blended with 2.99 parts of Emulsifier A, 15 parts of the methyl ether of propylene glycol, emulsified in water at a total solids content of 65 percent. The EEW of this emulsion is 554.
Hydrophobic Polyepoxide G—a blend of 21 parts of Hydrophobic Polyepoxide A, 10 parts of a monoglycidyl ether of a $C_{14-16}$ alcohol and 3 parts of Emulsifier A dispersed in water at a 60 percent solids level.
Hydrophobic Polyepoxide H—a blend of 70 parts Hydrophobic Polyepoxide E, 39 parts of cyclohexane 1,4 dimethanol diglycidyl ether and 3 parts of Emulsifier A; emulsified in water at a solids level of 64 percent.
Hydrophobic Polyepoxide l—a diglycidyl ether resulting from the reaction of Hydrophobic Polyepoxide C and bisphenol A having an EEW of 640, dissolved in xylene, 75 percent by weight.
Emulsifier A—a block copolymer comprising a nonyl phenol initiated poly(oxyethylene) poly(oxypropylene) ethanol having a molecular weight of about 2700.

EXAMPLE 1

In a one liter flask equipped with a heating mantle, electromotor driven stirrer, reflux condenser, thermocouple connected with a temperature control and nitrogen sparging is placed 746.4 g of Hydrophilic Polyepoxide A and 536 g of 3,5 xylidine. The mixture is stirred thoroughly and heated gradually to 160° C. at which temperature a slight exotherm starts which peaks at 171°C. The contents are reacted at 160° C. until the EEW is constant, about 4 hours. The resin has an EEW of 542 and a viscosity of 820 mPa.s at 25° C. and is referred to hereinafter as Hydrophilic Polyepoxide AA.

EXAMPLE 2

In a 250 mL flask equipped as in Example 1 are placed 160 g of resin prepared in Example 1 and 44 g of Hydrophilic Polyamine A. The contents are stirred thoroughly and heated gradually to 40° C. (initial target temperature). An exotherm begins and peaks at 118° C. (exotherm peak temperature) within 15 minutes after reaching 50° C. The temperature drops to 90° C. to 95° C. after about 45 minutes. 87 g of deionized water are added and the solution is stirred at 90° C. (stir temperature) for another 80 minutes (stir time). The theoretical amine hydrogen equivalent weight (AHEW), viscosity at 25° C., a non volatile content and solubility of the resin are determined and compiled in Table 1.

17.5 g of Hydrophobic Polyepoxide A and 32;9 g of the resin prepared in this example are contacted in an equivalent ratio of 1:1. The mixture is mixed thoroughly with stirring at 2000 rpm and 31 g of water is added incrementally until a fluid emulsion is obtained, A film is cast at 23° C. and 60 percent relative humidity and cured for 7 days. The film is tested for the following properties, coating thickness (60 micrometers), and pendulum hardness Persoz (sac), gloss at 20 percent and 60 percent angle, crosshatch adhesion percent remaining (100 percent), reverse impact (160 lb×inch), Erichsen indention (mm) and MEK double rubs The results are compiled in Table 2. The crosslink density of the amine curing agent is low and the coating is very flexible but not scratch resistant.

EXAMPLE 3

A curing agent is prepared according to Example 2 using Hydrophilic polyepoxide AA and Hydrophilic polyamine A. The conditions and properties of the curing agent are described in Table I. Any differences from the procedure of Example 2 are noted hereinafter. An exotherm starts and peaks at 78° C. The contents are heated at 80° C. and a second exotherm peaks at 870° C. From the time the contents reach 40° C. to the second exotherm peak is about 1 hour. Heating is continued for another 1½ hours at 900° C. to 95° C. Hydrophobic polyamine B is added at 95° C. and the mixture stirred for another 15 minutes. The product is a fine dispersion which when cooled crystallizes to a semi-solid resin.

A coating is prepared from the curing agent of this Example and Hydrophobic Polyepoxide A as described in Example 2. After contacting the components and stirring an additional 47 g of water are added incrementally to the pasty dispersion until a homogeneous fluid dispersion is obtained. A clear film is cast on a metal panel. The water evaporates within 30 minutes leaving a clear and glossy film, which cures to a glossy, hard and flexible film within 3 days. The properties are compiled in Table 1.

EXAMPLE 4

A curing agent is prepared according to Example 2 from Hydrophilic Polyepoxide A, Hydrophobic Polyepoxide A and Hydrophilic Polyamine A. After completion of the post exotherm stirring period, 128.0 g of deionized water are added at 95° C. and the mixture is cooled with stirring. The properties of the solid material are compiled in Table 1.

A film is prepared as described in Example 2. The mixture is cast on a metal panel and allowed to dry at 23° C. (at 60 percent relative humidity). A clear film forms very rapidly within 20 minutes. The properties are compiled in Table II.

EXAMPLE 5

In an apparatus as described in Example 1 are placed 103.56 parts of Hydrophilic Polyepoxide A, 41.43 parts of Hydrophobic Polyepoxide C, 27.6 parts of Hydrophobic Polyepoxide D, and 4.32 parts of Emulsifier A. The contents are stirred at 40° C. for 15 minutes. Then 99 parts of water are added incrementally over 20 minutes. A fluid dispersion is formed at a stirrer speed of 400 rpm. To the dispersion are added 13.38 parts ethanol amine within 15 minutes at 50° C. to 78° C. The rate of ethanol amine addition depends on the exotherm. After the ethanol amine addition is completed the dispersion is stirred at 400 rpm at 80° C. for 60 minutes. The epoxy equivalent weight of the product (hereinafter hydrophilic polyepoxide AB) is 700 and has a fine particle size which dissolves completely with 2 to 3 percent acetic acid (based on solid epoxy resin).

114 g of hydrophilic polyamine C are added to the colloidal emulsion at 77° C. to prepare an amine terminated curing agent. An exotherm starts at 77° C. and peaks at 88° C. The dispersion is stirred at 95° C. for 2½ hours before it is cooled. The emulsion properties are compiled in Table 1.

55.4 parts of Hydrophobic Polyepoxide F are mixed with 2,4.5 parts of the amine terminated curing agent resin of this Example to form a homogeneous emulsion after thorough mixing. The emulsion thickens after 48 hours and can be thinned down with a few percent of water. This fluid emulsion does not gel after more than one week. A clear film is formed within 30 hours. After 48 hours the particles of the emulsion are partly crosslinked but a continuous hazy film can be formed. The wet film becomes tack-free within 10 minutes, whereas a film cast from the emulsion within 10 hours of its potlife needs 10 hours to become tack free. However a film cast from the emulsion within 10 hours of its potlife is clear. The clear film is extremely adherent to glass and metal and very flexible after it cures at 23° C. for 7 days. The film is resistant to water, diluted hydrochloric acid (10 percent) and diluted caustic soda. The cured film also withstands more than 100 MEK (methylethylketone) double rubs. The resins of Example 2 to 4 demonstrate infinite water solubility. The non-volatiles content of the amine curing agents of Examples 2–4 is 70, and Example 5 is 75.

TABLE I

| | Example | | | |
|---|---|---|---|---|
| | 2 | 3 | 4 | 5 |
| Hydrophilic poly-epoxide/(g) | AA/160 | AA/200 | AA 121.2 | AB |
| Hydrophilic polyamine/(g) | A/44 | A/55 | A/98.1 | C/114 |
| Hydrophobic poly-epoxide/(g) | | | B/80.7 | |
| Hydrophobic poly-amine/(g) | | B/64 | | |
| Water | | | | |
| Initial target temp./contact temp. | 40 | 40 | 45 | |
| Exotherm peak peak (min) | 118 | 87 | 134 | 88 |
| Time to exotherm peak (min) | 15 | 60 | 20 | |
| Stir temp. (°C.) | 90 | | 90–97 | |
| Stir time (min) | 90 | 90 | 50 | 150 |
| Resin properties AHEW | 230 | 136 | 180 | 184 |
| Viscosity (mPa.s) 23° C. | 1800 | | 26000 | 1100 |
| Curing agent (g) | 32.9 | 13.6 | 25.7 | 24.5 |
| Hydrophobic poly-epoxide (g) | A/17.5 | A/17.5 | A/17.5 | F/55 |
| Water (g) | 31 | 58 | 28 | |
| speed (rpm) | 2000 | 100 | 2000 | |
| Film properties | | | | |
| Persoz hardness (sec) | 20 | 250** | 230** | |
| Gloss | | | | |
| 20 percent, angle | 84/100 | —/90 | 95/— | |
| 60 percent angle | | | | |
| Erichsen indentation (mm) | >10 | 9.1 | 9.5 | |
| MEK double rubs | >100 | >100* | >100* | >100 |
| Tack free time (hrs) | | 10 | 8 | |

*After 2 days cure;
**After 6 days cure ambient conditions.

EXAMPLE 6 and 7

Amine advanced hydrophilic polyepoxides are prepared and reacted with a hydrophilic polyamine to prepare an amine terminated curing agent according to the following procedure. The polyepoxide components are placed in a 500 cc reaction flask and 5 heated. The n-octyl amine is dropped into the mixture over a period of time at a reaction temperature. The mixture is heated with stirring for a period of time. The mixture is cooled to 100° C. and hydrophilic polyamine A is added at once. The mixture cools to 85° to 86° C. The heating mantel is removed and the mixture exotherms. The mixture is reacted at a temperature with stirring for a period of time. In Example 6 water is added. In Example 7 the mixture is cooled to 90° C. and water is added. The reaction conditions and properties of the resins are compiled in Table II. The resin of Example 6 exhibited infinite water solubility. The amine advanced resins of Example 6 and Example 7 are respectively referred herein as hydrophilic polyepoxide AC and AD, Blends of the curing agent of Example 7 with hydrophobic polyepoxide B and hydrophobic polyepoxide E at stoichiometric ratios cure within 7 days to provide a very flexible and glossy films.

TABLE II

|  | Example | |
|---|---|---|
|  | 6 | 7 |
| Hydrophilic polyepoxide A (parts) | 281.6 | 128.9 |
| Hydrophobic polyepoxide C (parts) |  | 115.7 |
| O-cresyl glycidyl ether (parts) |  | 12.8 |
| Octyl amine (parts) | 46.4 | 45.7 |
| Hydrophilic polyamine (parts) | 72 | 97 |
| Polyepoxide preheat temp. °C. | 100 | 90 |
| Octyl amine addition time (min) | 20 | 30 |
| Octyl amine addition temperature (°C.) | 100–120 | 120 |
| Post addition heating temp. (°C.) | 120 | 110 |
| Post addition heating time (min) | 90 | 60 |
| Exotherm after polyamine addition (°C.) | 98 | 114 |
| Reaction temperature (°C.) | 100 | 115 |
| Reaction time (min) | 90 | 120 |
| Viscosity (mPa.s) | 9600[2] | 25000[1] |
| Nonvolatile Content | 90 | 70 |

EXAMPLES 8–12

Into an apparatus as described in Example 1 are placed the polyamine components which are heated to 95° C. (90° C. for Example 9, and 14 to 19). A well mixed blend of the polyepoxide components is added over 75 minutes (60 minutes for Examples 9 and 14 to 19) at a temperature which is maintained at 115° C. (or less) (100° C. for Example 9 and 14 to 19). Heating is continued at 105° C. for 90 minutes after addition.

The contents of the flask are cooled to 95° C. (100 for Example 9 and 14 to 19), and 170 parts deionized water (128 for Example 9 and 14 to 19) are added to dissolve the polymer. The components used, resin properties and film properties are compiled in Table III. The solids level is 70 and the AHEW is 180 for all resins prepared.

A mixture of 451.83 parts of Hydrophobic Polyepoxide F (nonvolatiles 89 percent) and 18.6 parts of the methylether of propylene glycol (to nonvolatiles content of 85 percent) are placed into a 1000 cc stainless steel beaker. 47 parts water is added with stirring at 2000 rpm over 10 minutes. 168 parts water is added in increments to the pasty mix with stirring at 2000 rpm over 10 minutes. The epoxy emulsion has following properties, viscosity 970 mPa.s at 23° C., pH value 6.9 and a solids content of 64 percent.

The amine terminated curing agents are mixed with the polyepoxides listed in Table III and cast on Bonder steel panels. The films are cured for 7 days at 23° C. at 60 percent (50 percent for Example 8) relative humidity. The formulations are coated on glass plates periodically. The pot life of dispersions is 1 to 2 hours over which the viscosity remains relatively constant. The usable pot life is only slightly affected by the degree of dilution or the quantity of material mixed. Films with an almost constant gloss are obtained, the level of which depends on the pigmentation percentage. At temperatures within the range 15° to 20° C. films 50 to 100 micrometers inch thick are normally dust-dry overnight and hard dry after 24 to 36 hours.

In Table III the water solubility is measured at 30 percent solids using the following key P=poor, F=fair, G=good and E=excellent. The gloss ratings of films for Examples 14–17 uses the same scale. For pendulum hardness the top number is for 1 day cure, the bottom is for 7 days cure. The MEK double rubs are measured for films cured for 1 day at ambient temperatures. The surface tack for Examples 8 and 10–12 after 24 hours cure is noted and Examples 8, 11 and 12 exhibit slight tack and Example 10 exhibits severe tack. The films of Examples 11 and 12 demonstrate crosshatch adhesion test results of 100 percent, a pot life of 1.5 hours, and a Front Reverse impact of 160/160. Example 13 exhibited a Front Reverse impact of 160.

TABLE III

|  | Example | | | | | | | | | | | |
|---|---|---|---|---|---|---|---|---|---|---|---|---|
|  | 8 | 9 | 10 | 11 | 12 | 13 | 14 | 15 | 16 | 17 | 18 | 19 |
| Hydrophilic Polyamine A | 20.68 | 10.4 | 19.1 | 22.1 | 22.1 | 22.1 | — | 20.4 | 19.8 | — | 9.9 | 10.6 |
| Hydrophilic Polyamine C | 16.92 | 18.1 | 19.1 | 14.7 | 14.7 | 14.7 | 28.6 | 13.6 | 13.3 | 28.7 | 19.9 | 17.2 |
| Hydrophilic Polyamine D | — | — |  |  |  |  |  |  |  | 10.4 |  |  |
| Reactive Polyamide B | — | 18.1 |  |  |  |  | 28.6 | 3.8 | 8.3 | 13.1 | 19.9 | 17.2 |
| Hydrophilic Polyepoxide A | 31.2 | 35.4 | 30.8 | 31.7 | 31.6 | 31.6 | 42.8 | 31.1 | 29.3 | 23.9 | 37.8 | 35.4 |
| Amine catalyst-1 |  | 5.2 |  |  |  |  |  |  |  |  |  | 7.8 |
| Hydrophobic Polyepoxide C | 28.1 | — | 23.2 | 28.4 | — |  | — | 28.0 | 26.4 | 21.5 | 12.5 | 11.8 |
| Hydrophobic Polyepoxide E | — | 11.8 | — | — | 28.5 | 28.5 |  |  |  |  |  |  |
| O-cresyl glycidyl ether | 3.1 | — | 7.7 | 3.1 | 3.1 | 3.1 | — | 3.1 | 2.9 | 2.4 | — | — |
| Epoxy Resin Cured | F | G | G | G | G | H | G | G | G | G | G | G |
| Viscosity mPa.s 25° C. | 23000 | 8000 | 6300 | 23500 | 10600 |  | 26000 | 12500 | 23000 | 19000 | 180500 | 7000 |

TABLE III-continued

| | Example | | | | | | | | | | | |
|---|---|---|---|---|---|---|---|---|---|---|---|---|
| | 8 | 9 | 10 | 11 | 12 | 13 | 14 | 15 | 16 | 17 | 18 | 19 |
| pH - 20% in water | 10.9 | 11.0 | 10.7 | 10.9 | 10.9 | | — | 10.0 | 9.75 | 10.2 | 11.1 | 11.0 |
| Water solubility | P | E | P | F | F | | G | P | P | P | E | E |
| gloss rating 20°/60° | | 93 | | 24/60 | 19/53 | 87/99 | F/G | F | F/G | E | 89 | 93 |
| Pendulum Hardness persoz (sec) | | 44 | | 15/160 | 15/160 | 130 | 8 | 15 | 21 | 34 | 20 | 44 |
| Film drying time (hrs) | | 5.3 | | 6 | 6.5 | | | | | | 6.0 | 5.3 |
| MEK double rubs | | 80 | | 80 | 80 | | | | | | 60 | 90 |
| Erichsen (mm) | | 9.8 | | 9.5 | 9.5 | 10 | | | | | 9.8 | 9.7 |
| Cloud Point °C. | 45 | | 43 | 48 | 52 | | | | | | | |

EXAMPLES 20–22

In Examples 20–22 amine terminated curing agents as prepared in Example 9 are formulated with hydrophobic polyepoxides to prepare coatings. In Example 21 the amine terminated curing agent disperses Hydrophobic Polyepoxide E in water. In Example 22 the amine terminated curing agent is modified by the addition of 3 percent by weight of formic acid, and used to form a two-part paint composition. Component A comprises 31.2 parts of the amine terminated curing agent of Example 9 (non-volatile 71 percent), 0.3 parts of BYK 033 air release agent, 6.1 parts of a 10 percent formic acid solution, 24.2 parts of Finnitan RR2 white pigment, 12.6 parts of talc 20M2 filler and 25.6 parts of deionized water (solids level 59 percent) as one part and Component B comprises 37 parts of Hydrophobic Polyepoxide G and 14 parts deionized water (20 percent PVC) as the other part.

The ingredients of component A are stirred rapidly with a high speed dissolver containing a rotating disc at 6000 rpm for 10 minutes. The temperature of the pigmented paste reaches 60° C. The pigmented paste is allowed to cool to 23° C. and then mixed using a propeller type stirrer with Component B. A film is cast with a 200 micrometers draw down bar to obtain a film of dry thickness of 60 micrometers. The film is cured for 7 days at 23° C. and 60 percent relative humidity.

The properties of the coatings are summarized in Table IV. In Table IV for double rubs and Pendulum Hardness the number of days refers to the curing time. Both Examples 20 and 21 demonstrated noticeable potlife.

TABLE IV

| System | 20 | 21 | 22 |
|---|---|---|---|
| Epoxy Resin Cured | G | E | G |
| Pot life (hrs) | 1 | 1 | 1–2 |
| Through film drying (hrs) | 10 | 7.8 | 5 |
| MEK double rubs | | | |
| 1. day | 60 | 70 | |
| 2. day | 100 | 11 | |
| 3. day | >160 | >160 | |
| Pendulum hardness (sec) | | | |
| 1. day | 17 | 25 | |
| 2. day | 58 | 84 | — |
| 3. day | 84 | 129 | — |

TABLE IV-continued

| System | 20 | 21 | 22 |
|---|---|---|---|
| 7. day | 114 | 187 | 115 |
| Adhesion crosshatch (%) | 100 | 99 | 100 |
| Erichsen flexibility (mm) | >9.7 | >10 | 9.1 |
| Front/reverse impact (lb. in) | >160/<160 | >160/>160 | 120/32 |
| Percent gloss at 20°/60° angle | 88/97 | 76/95 | 37/79 |

Curing conditions 7 days 23° C./50% RH, coating thickness 55–60 micrometers

EXAMPLE 23

Hydrophilic polyepoxides B, D and E are prepared from the components listed in Table V using the following procedure: The alkylene glycol, epichlorohydrin and benzyltriethylammonium chloride are placed into a jacketed reaction vessel equipped with a mechanical stirrer, overhead condenser and a dropping funnel. This mixture is azeotropically dewatered under vacuum (90 to 100 mbar, 47° C.) over a period of 1 hour. Then 50 percent aqueous sodium hydroxide solution is slowly added to the vigorously stirred mixture through the dropping funnel over 2 hours. The reactor content is held at 40 to 45° C. during that time. After caustic addition is complete, the reaction mixture is stirred for 5 hours at 40° C. Then methyl-isobutylketone (MIBK) is added, the stirrer is switched off and the phases are allowed to separate for 15 minutes. The lower aqueous phase is drained off and the organic phase is washed three times with 1000 m L water each. After removal of the solvent the residual resin is filtered through a 80 mesh sieve and then dissolved in MIBK. To this resin/MIBK: solution, aqueous sodium hydroxide solution is added at 60° C. over a period of 15 minutes. The reaction mixture is stirred at this temperature for 1 hour, then cooled to ambient temperature and washed with four lots 1000 mL of deionized water. After removal of the solvent, the polyepoxides are recovered and their properties are determined. The properties are compiled in Table V. Hydrophilic Polyepoxide E exhibits a viscosity of 50 mPa.s and 25° C. and color Gardner 1.

TABLE V

| Hydrophilic polyepoxide | B | D | E |
|---|---|---|---|
| Alkylene glycol type | dipropylene glycol | polytetra hydrofuran glycol ether (MW 1000) | 1,4-bis (hydroxy methyl) cyclohexane |
| Alkylene glycol (g) | 1380 | 2000 | 1200 |
| Epichlorohydrin (g) | 6800 | 6000 | 5000 |

TABLE V-continued

| Hydrophilic polyepoxide | B | D | E |
|---|---|---|---|
| Benzyltric ethyl ammonium chloride (g) | 150 | 100 | 50 |
| Sodium hydroxide First add (g) | 2000 | 4000 | 1380 |
| MIBK first add (g) | 1000 | 2000 | — |
| MIBK second add (g) | 1600 | 1600 | 1000 |
| sodium hydroxide second add (g) | 2000 | 1600 | 1700 |
| Weight % epoxide | 31.6 | 6.6 | 30.8 |
| EEW | 136 | 651 | 140 |
| Hydrolyzable chloride ppm | 450 | 800 | 160 |
| total chloride ppm | 2400 | 1400 | 3200 |
| Residual OH wt % | 1.1 | 1.1 | |

EXAMPLES 24–26

Two amine terminated polyepoxides are prepared by the following procedure. The components and the amounts with the resin properties are compiled in Table VI. The hydrophobic amine, hydrophilic amine and reactive polyamide are placed into a flask, fitted with a dropping funnel, thermoelement, reflux condenser and electrically controlled heating mantle. The contents are heated to 90° C. and a well mixed epoxy resin mixture is added over 40 to 60 minutes at a temperature of 90–100° C. The mixture is heated at 95 to 100° C. for another minutes. Water is added in increments to form a dispersion. The contents are allowed to cool to 65° C. to 70° C. and oxalic acid is added in 3 portions (5.5 parts each), so as to maintain the exotherm at or below 80° C. The mixture is stirred at 65° C. to 70° C. for another 30 to 60 minutes. In Example 25 an additional portion of water is added. The products of Example 24 and 25 are referred to hereinafter as Polyaminoepoxy Adduct A and Polyaminoepoxy Adduct B respectively. In Examples 25 the dispersion turns into a clear solution at ca. 58° C.

TABLE VI

| Monomers | Example 24 | Example 25 | Example 26 |
|---|---|---|---|
| Hydrophobic polyamine A | 24.3 | 24.3 | 60.6 |
| Hydrophilic polyamine A | 7.3 | 7.3 | 30.3 |
| Reactive Polyamide A | 17.0 | 17.0 | 60.6 |
| Hydrophilic polyepoxide A | 35.1 | 30.8 | 96.0 |
| Hydrophilic polyepoxide C | — | 20.6 | |
| Hydrophilic polyepoxide B | 16.3 | — | |
| Hydrophilic polyepoxide E | | | 52.5 |
| Oxalic acid (100% active) | 5.5 | 5.5 | |
| Acetic acid (100% active) | — | 1.0 | |
| Oxalic acid dehydrate | | | 25.5 |
| Calc. AHEW of unmod. adduct | 160 | 160 | 312 |
| % solids in water | 60 | 60 | 54.3 |
| Product viscosity, mPa.s/25° C. | 3900 | 3600 | 5100** |
| pH of 20% solution in water without acetic add | 9.75 | 9.6 | 9.4 |
| Stability of a 30% solution in oven at 40° C. | good | none | |
| Cured film appearance overnight cure at 23° C., 60 RH | glossy | glossy | |
| Cured film hardness, 24 hrs cure at 23° C./60 RH, Persoz (sec) | 25 | 25 | |
| Cured film quality, baked at 80° C./30 minutes | clear not tacky | hazy tacky | |

*Trademark of The Dow Chemical Company
**23° C.

The epoxy resin mixture of Example 25 does not produce good results since the stability of this product is poor, as the mixture contains a high —$CH_2$—Cl containing epoxide. The properties of the coating of Example 26 are compiled in Table VII. In the table the time refers to how long the film tested is cured at ambient temperature.

TABLE VII

| Pendulum Hardness, Persoz (sec) | |
|---|---|
| 1st day | 52 |
| 2nd day | 88 |
| 3rd day | 119 |
| 7th day | 206 |
| Front/Rev. Impact (in × lb) 7th day | 156/80 |
| MEK Double Rub resistance | |
| 1st day | 60 |
| 2nd day | >100 |
| Adhesion, % remain | 100 |
| Erichsen indentation (mm) | 9.7 |

EXAMPLE 27–30

Several coatings are formulated using the components listed in Table VIII. The potlife of the resins of Examples 27 and 28 is 2 to 3 hours.

The pigment volume concentration (PVC) in the paints in Examples 26 and 27 is 25 percent. The ingredients of Component A, except for the larger amount of water which is used to dilute the pigmented paste later, are placed into a steel beaker and the contents are stirred at 6000 rpm using a dissolver blade type stirrer for 30 minutes. The contents reach 52° C. After the grinding step is completed water is added to the pigmented paste and stirred at 300 rpm until a homogeneous dispersion is obtained. The pigmented dispersion is allowed to cool to 25° C. before the epoxy resin emulsion is added. The total solids in the pigmented curing agent dispersion to 60 percent. 200 micrometers wet films are cast onto zinc-phosphated binder plates using a draw down coating bar. The coatings are cured at 23° C. at 60 percent RH for 7 days. The properties of the coatings are compiled in Table VIII.

The property comparison of Examples 27 and 28 shows that the hardeners of the invention enable production of more efficient pigment binders given superior properties over commercially available epoxy amino adducts.

The film of Example 27 has pinholes all over and yellowish tint. The film of Example 28 has a smooth white appearance. The pigment volume concentration of the coatings of Example 29 and 30 is 31 percent.

TABLE VIII

| Properties | 27 | 28 | 29 | 30 |
|---|---|---|---|---|
| Commercially available polyamino epoxy adduct AHEW 140, 70% solids in water | 23.78 | — | 17.92 | — |
| Polyamino epoxy adduct A | — | 31.04 | — | 23.59 |
| Water d.i. | 5.17 | — | | |
| Byk 033 (Defoamer) | 0.24 | 0.26 | 0.06 | 0.21 |
| Finntitan RR2 (Pigment) | 23.31 | 22.45 | | |
| Talkum 20M2 (Filler) | 20.04 | 19.32 | | |
| Resiflow W50 (Flow additive) | | | 0.66 | — |
| Sicor ZNP/S (Zincphosphate) | | | 16.51 | 16.04 |
| Bayferrox 180M (Pigment) | | | 6.67 | 6.46 |
| Blank fix N (Filler) | | | 15.72 | 15.41 |
| Talkum AT 1 (Filler) | | | 8.55 | 8.30 |
| Water, d.i. | 27.46 | 26.93 | 33.90 | 30.00 |
| | 100.00 | 100.00 | 99.99 | 100.01 |
| Component B | | | | |

TABLE VIII-continued

| Properties | 27 | 28 | 29 | 30 |
|---|---|---|---|---|
| Hydrophilic polyepoxide E | 35.67 | 32.15 | 26.88 | 24.44 |
| Water, d.i. | | 2.97 | 2.66 | 2.24 | 2.12 |
| Through film drying time (hrs) | 5–6 | 5 | 11.7 | 6.4 |
| Pendulum hardness, persoz (sec) | 170 | 185 | | |
| after 1 day | | | 34 | 46 |
| after 2 days | | | 58 | 93 |
| % gloss at 20° C./60° C. angle | 11/47 | 37/79 | | |
| Adhesion, % remain | 95 | 100 | | |
| Erichsen Flexibility (mm) | 5.3 | 7.8 | | |
| Front/Reverse impact (lb × in) | 40/<4 | 120/40 | | |

EXAMPLES 31–34

Four amine terminated resins are prepared as described in Example 24 using the ingredients listed in Table IX. The coatings are prepared using Hydrophobic Polyepoxide F, and the properties are compiled in Table IX. The appearance of cured films on a glass plate after curing overnight at 23° C. and 60 percent relative humidity (RH) is hazy with very slight tack for Example 31, good film homogeneity with no tack for Example 32, hazy with no tack for Example 33 and very hazy with very slight tack for Example 34. The appearance of heat cured films (80° C. lot 30 minutes) is mat with slight hot tack for Example 32, semi-mat with slight tack for Example 33 and very mat with tack for Example 34. The percent solids in water of the amine terminated curing agents of these examples is. 61, and the AHEW of such solution is 277.

EXAMPLES 35–36

Two water soluble adducts are prepared with Hydrophilic Polyepoxide D according to the procedure of Example 34. One is prepared with Hydrophilic Polyepoxide B as a comonomer and the second with Hydrophilic Polyepoxide C. The coatings are cured using Hydrophilic Polyepoxide F. The components and properties are listed in Table X.

TABLE IX

| Monomers | 31 | 32 | 33 | 34 |
|---|---|---|---|---|
| Hydrophilic polyamine A | 24.7 | 24.7 | 24.8 | 24.8 |
| Hydrophobic polyamine A | 7.9 | 7.9 | 5.7 | 5.7 |
| Reactive polyamide A | 16.8 | 16.8 | 16.6 | 16.6 |
| Hydrophilic polyepoxide A | 9.2 | 28.2 | 36.1 | 21.8 |
| Hydrophilic polyepoxide B | 41.4 | — | — | 31.1 |
| Hydrophilic polyepoxide C | — | 22.4 | 16.8 | — |
| Oxalic acid (100% active) | 5.5 | 5 | 5 | 5.5 |
| Point Temperature | 80 | 80 | 63 | 58 |
| Viscosity, mPas/25° C., solution | 15500 | 4800 | 4200 | 6800 |
| pH of 20% solution in water | 9.3 | 9.8 | 9.8 | 9.6 |
| Stability of a 30% solution 40° C. | good | good | excellent | good |
| Through film drying time (hrs) | 11 | 8.5 | 11 | 14 |
| Pendulum hard., Persoz (sec) 1 day | 50 | 65 | 85 | 60 |
| Erichsen indentation (mm) | 9 | 9 | 7.9 | 8.1 |
| Front/Reverse Impact (inch × lb) | 110/80 | 110/80 | 60/45 | 60/45 |
| Gloss %, 20° angle | 65 | 82 | 70 | 55 |

TABLE X

| Monomers | 35 | 36 |
|---|---|---|
| Hydrophobic polyamine A | 24.0 | 24.0 |
| Hydrophilic polyamine A | 7.2 | 7.2 |
| Reactive polyamide B | 16.6 | 16.6 |
| Hydrophobic polyepoxide F | 21.1 | 5.4 |
| Hydrophilic polyepoxide B | 30.9 | — |
| Hydrophilic polyepoxide C | — | 46.6 |
| Oxalic acid (100% active) | 5 | 6 |
| % solids in water | 61 | 61 |
| Amine hydrogen equiv. wt, solution | 277 | 277 |
| Temp. at which product becomes cloudy | 85 | 85 |
| Viscosity, mPas/25° C. | 6800 | 10000 |
| pH of 20% solution in water | 9.9 | 8.9 |
| Stability of a 20% solution in water at 40° C. | excellent | good |
| Appearance of a cured film on a glass plate, over night at 23° C./ 60% RH | high gloss not tacky | very mat tacky |
| Appearance of heat cured film 30 min./80° C. bake | very glossy no hot tack | mat tacky |
| Through film drying time (hrs) | 7 | >20 |
| Pendulum hardness, Persoz (sec) | 240 | 105 |
| Erichsen indentation (mm) | >10 | 6.5 |
| Front/Reverse Impact (inch × lb) | 160/160 | 75/60 |
| Gloss %, 20° angle | 95 | 45 |
| Pigmentation rating | very good | fair |

EXAMPLE 37

65.4 parts of Hydrophilic Polyepoxide D is continuously added into 34.6 parts by weight of Hydrophobic Amine A for 40 minutes at 95° C. to 100° C. The temperature is maintained for another 90 minutes at 95° C. to 100° C. The resin has an AHEW of 140 and a viscosity, mPa.s at 23° C. of 3340 and shall be referred to a Polyaminoepoxy Adduct D. An emulsion of Polyaminoepoxy Adduct D is prepared by contacting 100 parts with 3 parts of Emulsifier A and 19.6 parts of deionized water. The mixture forms an emulsion of 1000 mPa.s at 23° C. and forms film having very rapid water release. 17.2 parts of the emulsions of this example, 31.0 parts of Hydrophobic Polyepoxide F (65 percent in water) and 1.4 parts tris(dimethyl)amino methyl phenol are mixed rapidly with wooden spatula by hand until a homogeneous emulsion is formed. Then 5.0 parts deionized water are added and the mixture is stirred. Films are cast to give 200 micrometers wet film thickness. Some films are baked at 80° C./30 min. (I) and others are cured for 7 days but without catalyst. The films have the following properties.

| Properties | I | II |
|---|---|---|
| Cure | 30 min/80° C. | 7 days/23° C. |
| MEK Double rubs | 60 | >100 |
| Coating Thickness, um | 105 | 105 |
| Gloss 20°/60° angle, % | 93/98 | 93/98 |
| Adhesion, % remain | 100 | 100 |
| Erichsen, indentation, mm | 9.8 | 9.8 |
| Front/Reverse Impact, lb × in | 160/160 | 160/160 |
| Pendulum hardness (Persoz, sec) | 245 | 103 |

EXAMPLES 38 and 39

Two polyamine-epoxy adducts are prepared using hydrophilic polyamine D. The adducts are formulated with a dispersion of Hydrophilic Polyepoxide F (65 percent N.V.) at a stoichiometric mix ratio of 1:1. A dry film of 50 to 60 micrometers is cured on Bonder steel panels at 23° C. at 60 percent RH. The components and properties are listed below. The pigmentability rating of Example 38 is fair and Example 39 is excellent. The appearance of a cured film on a glass plate (23° C./60 percent RH) in Example 38 is fairly glossy and in Example 34 is very glossy.

Example 38 is modified with 1 percent formic acid (1 part per 100 parts solid adduct) to be equivalent to Example 39 as to solution stability and pigmentability. As a result drying time of Example 38 increases to 13 hours and hardness decreases by 15 percent. The AHEW of the amine curing agent solution is 278.

| Monomers | 38 | 39 |
|---|---|---|
| Hydrophobic amine A | 28.0 | 28.0 |
| Hydrophilic polyamine B | 11.2 | 11.2 |
| Reactive polyamide B | 16.8 | 16.8 |
| Hydrophilic polyepoxide B | — | 19.5 |
| Hydrophilic polyepoxide C | 7.8 | — |
| Hydrophilic polyepoxide A | 36.2 | 24.5 |
| Water, d.i. | 65.0 | 65.0 |
| Oxalic acid dihydrate | 8.5 | 8.5 |
| Viscosity, 62% solution, mPas/23° C. | 7100 | 4800 |
| Cloud point of polymer solution | 68° C. | 81° C. |
| pH of 20% solution in water | 9.4 | 9.7 |
| Stability of 30% solution in water at 40° C. | none | good |
| Through film drying time (hrs) | 11.8 | 7.5 |
| Pendulum hardness, Persoz (sec) | | |
| 1st day | 31 | 42 |
| 2nd day | 58 | 72 |
| 3rd day | 110 | 154 |
| 4th day | 151 | 213 |
| 7th day | 185 | 238 |
| Erichsen indentation (mm) | 8.7 | 9.0 |
| Front/Reverse Impact (inch × lb) | 125/96 | 144/116 |
| Adhesion, % remain | 100 | 100 |
| Gloss %, 20°/60° angle | 34/53 | 67/92 |

EXAMPLE 40

28 g of a water dispersion of the amine terminated curing agent of Example 9 (55 percent nonvolatiles), 17.3 g of Finnitan RR2 titanium dioxide, 1.21 g Bayferrox 130M iron oxide, 1.21 g Bayferrox 920 iron oxide, 17.30 Sicor ZN/PS zinc phosphate, 17.3 g of Blanc Fix N barium sulfate, 0.21 g of Dow Corning G defoamer and 17 g of dimineralized water are placed in a stainless steel cup. The mixture has a nonvolatiles level of 70 percent. The mixture is agitated with a small propeller at 6000 rpm for 30 minutes. The resulting pigment paste is allowed to stand overnight. Thereafter, the pigment paste is blended with Hydrophobic Polyepoxide I (56.7 g) at a stoichiometric ratio. No thixotropic behaviour is noticed. A small amount of demineralized water is added to achieve a suitable viscosity for coating. The coating has a PVC of 20 percent. A film is cast on a steel panel. The film is smooth and glossy and dry to the touch after 1 hour at 23° C. and 55 percent relative humidity. The potlife of the coating is greater than 24 hours and the film cures within 24 hours to a hard glossy film. This example demonstrates the emulsification of a hydrophobic polyepoxide in a coating by the amine curing agents without high thixotropy.

We claim:

1. A water miscible or soluble amine terminated resin useful as a curing agent for an amine curable resin which is the reaction product of:

A.) a polyamine component comprising one or more hydrophilic poly(oxyalkylene) amines, and optionally one or more hydrophobic polyamines;

B.) a polyepoxide component consists essentially of i) one or more diglycidyl ethers of a polyalkylene glycol, ii) one or more diglycidyl ethers of a cycloalkylene glycol, or a mixture thereof and optionally iii) and one or more hydrophobic polyglycidyl ethers, or a reaction product of i), ii) or a mixture thereof, and optionally iii) with an amine extender having two active amine hydrogen atoms;

C.) optionally, a reactive diluent which is capable of reacting with an epoxy resin; and D.) optionally, a catalyst for the reaction of an amine with an epoxy resin; and wherein component A is employed in an equivalent excess with respect to component B such that the terminal moieties of the reaction product are amine moieties capable of reacting with an epoxy resin, the composition has an amine hydrogen equivalent weight of from 140 to 240, and the combined amount of the poly (oxyalkylene) amine and the diglycidyl ether of polyalkylene glycol, diglycidyl ether of a cycloalkylene glycol, or a mixture thereof is sufficient to render the composition is water soluble or water miscible.

2. A resin composition according to claim 1 wherein component A). comprises from 30 to 70 percent by weight of the total composition, with the proviso that no more than 30 percent by weight of the total composition can be derived from hydrophobic polyamines; component B). comprises from 30 to 70 percent by weight of the total composition, with the proviso that no more than 35 percent by weight of the total composition can be derived from hydrophobic polyglycidyl ethers; component C.) may be present in amounts from 0 to 15 percent by weight; and component D. may be present in amounts of from 0 to 15S percent.

3. A resin according to claim 2 wherein the hydrophilic poly(oxyalkylene) amines correspond to Formula 1:

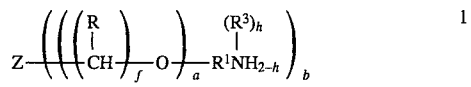

wherein the diglycidyl ether of a polyalkylene glycol corresponds to Formula 3:

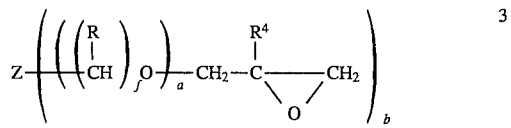

the hydrophobic polyamine corresponds to Formula 2:

the hydrophobic polyglycidyl ether corresponds to Formula 4:

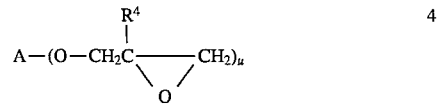

the amine extending agent corresponds to Formula 2 or to the formula:

$R^8NH_2$ the reaction product of an amine extending agent with one or more diglycidyl ethers of a polyalkylene glycol, one or more diglycidyl ethers of a cycloalkylene glycol, or a mixture thereof and optionally one or more hydrophobic polyglycidyl ethers corresponds to Formula 11:

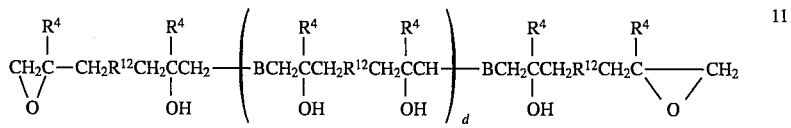 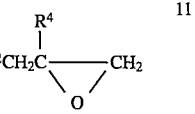

wherein:

A is independently in each occurrence an aryl moiety; aryl moiety substituted with an alkyl or halo moiety; a polyaryl moiety or a polycycloaliphatic moiety wherein the aryl moieties or the cycloaliphatic moieties are connected by direct bonds, alkylene, haloalkylene, cycloalkylene, carbonyl, sulfonyl, sulfinyl, oxygen, or sulfur moieties, such polyaryl or polycycloaliphatic moieties being optionally substituted with one or more alkyl or halo moieties; or the oligomeric reaction product of an aldehyde and phenol;

B independently in each occurrence corresponds to one of the formulas:

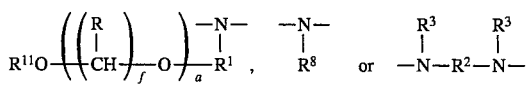

R is independently in each occurrence hydrogen, methyl or ethyl;

$R^1$ is independently in each occurrence a $C_{1-10}$ straight- or branched-chain alkylene, $C_{1-10}$ straight- or branched-chain alkenylene moiety, or a $C_{5-12}$ divalent cycloaliphatic moiety;

$R^2$ is independently in each occurrence a $C_{1-50}$ hydrocarbylene moiety, which may be substituted with a non-interfering substituent and which may contain one or more secondary amines, ether, amide or thioether moiety in the backbone;

$R^3$ is independently in each occurrence hydrogen or a $C_{1-10}$ straight- or branched-chain alkyl $C_{1-10}$ moiety;

$R^4$ is independently in each occurrence hydrogen or $C_{1-4}$ alkyl;

$R^5$ is independently in each occurrence a $C_{1-20}$ hydrocarbyl moiety which may be substituted with a non-interfering substituent;

$R^{11}$ is $C_{1-50}$ hydrocarbyl moiety;

$R^{12}$ is independently in each occurrence a moiety corresponding to one of the formulas:

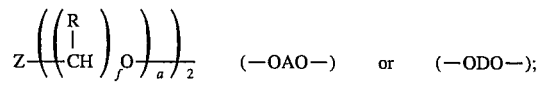

Z is independently in each occurrence oxygen or

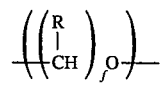

X is independently in each occurrence a straight- or branched-chain $C_{1-6}$ alkyl moiety;

D is independently in each occurrence a divalent $C_{5-20}$ aliphatic moiety containing one or more five or six membered saturated rings;

a is independently in each occurrence a positive real number of 1 or greater;

b is independently in each occurrence 2 or 3;

d is independently in each occurrence 0 to 5; and, f is independently in each occurrence an integer of from 2 to 4, with the proviso that for each $$-\left(\left(\begin{array}{c}R\\|\\CH\end{array}\right)_f O\right)-$$

unit if f is 2 and one R is ethyl the other R is hydrogen and that if f is 3 or 4 then R is hydrogen;

h is independently in each occurrence 0 or 1;

u is independently in each occurrence a positive real number greater than 1.

4. A resin according to claim 3 wherein the resin corresponds to Formulas 12 or 13

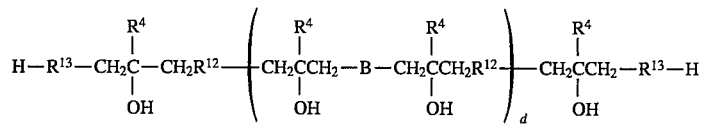

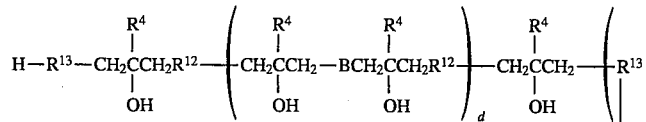

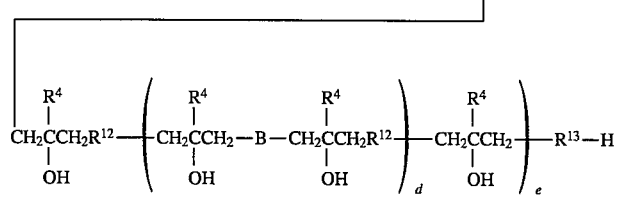

wherein:

A is independently in each occurrence an aryl moiety; aryl moiety substituted with an alkyl or halo moiety; a polyaryl moiety or a polycycloaliphatic moiety wherein the aryl moieties or the cycloaliphatic moieties are connected by a direct bond, alkylene, haloalkylene, cycloalkylene, carbonyl, sulfonyl, sulfinyl, oxygen, or sulfur moiety, such polyaryl or polycycloaliphatic moieties being optionally substituted with one or more alkyl or halo moieties; or the oligomeric reaction product of an aldehyde and phenol;

B independently in each occurrence corresponds to one of the formulas

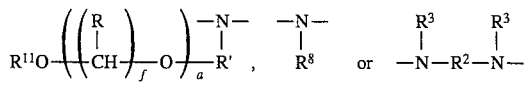

R is independently in each occurrence hydrogen, methyl or ethyl;

$R^1$ is independently in each occurrence a $C_{1-10}$ straight- or branched-chain alkylene, $C_{1-10}$ straight- or branched-chain alkenylene moiety, or a $C_{5-12}$ cycloaliphatic moiety;

$R^2$ is independently in each occurrence a $C_{1-50}$ hydrocarbylene moiety, which may be substituted with a non-interfering substituent and which may contain an ether, amide or thioether in the backbone;

$R^3$ is independently in each occurrence hydrogen or a $C_{1-10}$ straight- or branched-chain alkyl $C_{1-10}$ moiety;

$R^4$ is independently in each occurrence hydrogen or $C_{1-4}$ alkyl;

$R^8$ is independently in each occurrence a $C_{1-20}$ hydrocarbyl moiety which may be substituted with a non-interfering substituent;

$R^{12}$ is independently in each occurrence a moiety corresponding to one of the formulas

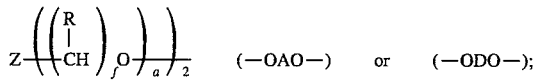

$R^{13}$ is independently in each occurrence a moiety corresponding to one of the formulas

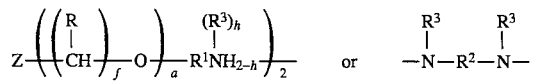

Z is independently in each occurrence oxygen or

X is independently in each occurrence a straight- or branched-chain $C_{1-6}$ alkyl moiety;

D is independently in each occurrence a divalent $C_{5-20}$ aliphatic moiety containing one or more five or six membered saturated rings;

a is independently in each occurrence a positive real number of 1 or greater;

d is independently in each occurrence 1 to 5; and e is independently in each occurrence 1 to 5; and f is independently in each occurrence an integer of from 2 to 4 with the proviso that for each

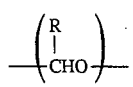

unit if f is 2 and one R is ethyl the other R is hydrogen and if f is 3 or 4 then R is hydrogen; and h is independently in each occurrence 0 or 1.

5. A process for the preparation of an amine terminated resin composition according to claim 1 which process comprises contacting Components A) and B) optionally Components C) and/or D) wherein Component A is employed in an equivalent excess with respect to Component, B such that the terminal moieties of the reaction product are amine moieties capable of reacting with an epoxy resin; wherein the combined amount of the poly(oxyalkylene) amine and the diglycidyl ether of polyalkylene glycol, diglycidylether of cycloalkylene glycol, or a mixture thereof is sufficient to render the final composition water-soluble or miscible; and initiating the reaction by heating the contacted components until an exotherm results and thereafter maintaining the temperature at a temperature at which the amine moieties react with glycidyl ether moieties until an amino hydrogen equivalent weight of from 140 to 240 is achieved, wherein the terminal moieties of the reaction product are amine moieties capable of reacting with an epoxy resin; and the composition is water soluble or water miscible.

6. The process of claim 5 wherein the Component B is continuously added the reaction mixture to control the amine hydroxy equivalent weight and to control the reaction such that the substantially all of polyepoxide moieties are end-capped with an amine, 7. A stable aqueous coating composition comprising I.) water;

II.) a resin composition according to any one of claims 1 to 4; and

III.) a polyepoxide.

8. A stable aqueous coating composition of claim 7 wherein the polyepoxide composition is a water emulsifiable epoxy resin composition comprising:

A) a polyepoxide of (1) the reaction product of i) one or more polyepoxides; ii) optionally, one or more polyaromatic hydroxy containing compounds; iii) optionally, one or more chain terminators; iv) one or more nominally difunctional $C_{12-36}$ fatty acids or dimers of unsaturated fatty acids; or (2) a mixture of one or more polyepoxides, and optionally one or more reactive diluents; and B) a sufficient amount of a surfactant to form a stable emulsion of (A) in water wherein the surfactant comprises an alkyl aryloxy poly(propyleneoxy) poly(ethyleneoxy) ethanol or a $C_{12-36}$ hydroxycarbyloxy poly(propyleneoxy) poly(ethyleneoxy) ethanol wherein the hydrocarbyloxy moiety is the residue of a $C_{12-36}$ fatty alcohol or $C_{12-36}$ fatty acid.

9. A curing agent according to claim 1 wherein the polyepoxide component has an EEW of 200 to 450 and the total chlorine content is 5.5 percent by weight or less, and the curing agent is optionally contacted with an organic or inorganic acid such that the pH of the curing agent in water is 8.5 or greater.

10. An article coated with a composition comprising the aqueous coating composition of claim 7.

11. A method of preparing a pigmented coating composition which comprises a. contacting a solution of an amine terminated curing agent according to claim 9 in water at a solids level of from 20 to 70 percent by weight with one or more pigments with agitation over a period sufficient to form a stable pigmented dispersion; and b. contacting the stable pigmented dispersion of a with a polyepoxide composition.

12. A product prepared by the process of any one of claims 5 or 6.

* * * * *